(12) United States Patent
Pan et al.

(10) Patent No.: US 11,664,927 B2
(45) Date of Patent: May 30, 2023

(54) WAVEFORM BASED DATA INTEGRITY CHECK AND ERROR CORRECTION

(71) Applicant: INTERDIGITAL PATENT HOLDINGS, INC., Wilmington, DE (US)

(72) Inventors: Kyle Jung-Lin Pan, Saint James, NY (US); Fengjun Xi, San Diego, CA (US); Byung K. Yi, San Diego, CA (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/066,861

(22) PCT Filed: Dec. 30, 2016

(86) PCT No.: PCT/US2016/069390
§ 371 (c)(1),
(2) Date: Jun. 28, 2018

(87) PCT Pub. No.: WO2017/117489
PCT Pub. Date: Jul. 6, 2017

(65) Prior Publication Data
US 2019/0028237 A1     Jan. 24, 2019

Related U.S. Application Data

(60) Provisional application No. 62/273,966, filed on Dec. 31, 2015.

(51) Int. Cl.
*H04L 1/00* (2006.01)
*H04B 17/336* (2015.01)
(Continued)

(52) U.S. Cl.
CPC ........ *H04L 1/0047* (2013.01); *H04B 17/336* (2015.01); *H04L 1/0053* (2013.01);
(Continued)

(58) Field of Classification Search
CPC ... H04L 1/0047; H04L 1/0053; H04L 1/0061; H04L 1/1829; H04L 5/0057;
(Continued)

(56) References Cited

U.S. PATENT DOCUMENTS 9,065,615 B2    6/2015   Lee et al.
9,143,284 B2    9/2015   Mikami
(Continued)

FOREIGN PATENT DOCUMENTS

EP    2 048 828    11/2011
EP    2 566 121    3/2013
(Continued)

OTHER PUBLICATIONS

Christian Hofbauer and Mario Huemer, 2010 IEEE International Conference on Communication Systems, pp. 426-430, 2010 (Year: 2010).*

(Continued)

*Primary Examiner* — Walter J Divito
*Assistant Examiner* — Anthony Luo
(74) *Attorney, Agent, or Firm* — Volpe Koenig

(57) ABSTRACT

A wireless transmit/receive unit (WTRU) may receive a unique word-error check (UW-EC) encoded signal. A pre-decoder data check entity may check for errors based on EC bits and systematic and parity bits from the UW-EC encoded signal. If an error is not detected at the pre-decoder data check entity, data without an error may be signaled to a source decoder without channel decoding.

20 Claims, 17 Drawing Sheets

(51) Int. Cl.
   *H04L 1/18* (2006.01)
   *H04L 5/00* (2006.01)
   *H04L 27/26* (2006.01)
   *G06F 11/10* (2006.01)
   *H04L 1/1829* (2023.01)

(52) U.S. Cl.
   CPC .......... *H04L 1/0061* (2013.01); *H04L 1/1829* (2013.01); *H04L 5/0057* (2013.01); *H04L 27/2605* (2013.01); *H04L 27/2636* (2013.01); *G06F 11/10* (2013.01)

(58) Field of Classification Search
   CPC ............ H04L 27/2605; H04L 27/2636; H04B 17/336; G06F 11/10
   See application file for complete search history.

(56) References Cited

U.S. PATENT DOCUMENTS

| | | | |
|---|---|---|---|
| 9,178,737 | B2 | 11/2015 | Fechtel |
| 9,229,853 | B2* | 1/2016 | Khan ..................... G06F 3/0608 |
| 2008/0304589 | A1 | 12/2008 | Tsuruta et al. |
| 2011/0055652 | A1* | 3/2011 | Park ...................... H04L 5/0007 |
| | | | 714/748 |
| 2011/0252292 | A1* | 10/2011 | Bose ................... H03M 13/134 |
| | | | 714/776 |
| 2011/0261775 | A1 | 10/2011 | Kim et al. |
| 2012/0051273 | A1 | 3/2012 | Febvre et al. |
| 2012/0213137 | A1* | 8/2012 | Jeong ................ H04W 52/0212 |
| | | | 370/311 |
| 2012/0218881 | A1* | 8/2012 | Liang ................... H04L 1/1861 |
| | | | 370/216 |
| 2015/0271247 | A1* | 9/2015 | Patsiokas ................ H04W 4/70 |
| | | | 709/217 |
| 2016/0371142 | A1* | 12/2016 | Kim ........................ G06F 7/584 |

FOREIGN PATENT DOCUMENTS

| | | | |
|---|---|---|---|
| EP | 2645611 | A1 | 10/2013 |
| JP | 2008016981 | A | 1/2008 |
| JP | 2009212586 | A | 9/2009 |
| KR | 2009-0009071 | A | 1/2009 |
| KR | 101275851 | B1 | 6/2013 |
| WO | 2012/027880 | | 3/2012 |

OTHER PUBLICATIONS

Berardinelli et al., "On the Potential of Zero-Tail DFT-Spread-OFDM in 5G Networks," Proceedings of the IEEE Vehicular Technology Conference (VTC) (Sep. 2014).
Berardinelli et al., "On the Potential of OFDM Enhancements as 5G Waveforms,", Proceedings of the IEEE Vehicular Technology Conference (VTC Spring), pp. 1-5 (2014).
Deng et al., "Simple implementations of mutually orthogonal complementary sets of sequences," Electronics Letters, vol. 36, Issue 11, pp. 993-994 (May 2000).
Ghosh et al., "Millimeter Wave Enhanced Local Area Systems: A High Data Rate Approach for Future Wireless Networks", IEEE Journal on Selected Areas in Communications, vol. 32, No. 6, pp. 1152-1163, (Jun. 2014).
Hofbauer et al., "Coded OFDM by Unique Word Prefix," IEEE International Conference on Communication Systems, pp. 426-430 (Nov. 2010).
Huang, "Simple Implementations of Mutually Orthogonal Complementary Sets of Sequences," International Symposium on Intelligent Signal Processing and Communication Systems (Dec. 2005).
Huber et al., "Signal Shaping for Unique-Word OFDM by Selected Mapping," 18th European Wireless Conference, Poznan, Poland (2012).

Huemer et al., "Coded OFDM by Unique Word Prefix," arXiv:1001.1298 https://arxiv.org/abs/1001.1298 (Jan. 8, 2010).
Huemer et al., "The Potential of Unique Words in OFDM," pp. 140-144 (2010).
NTT DOCOMO, "New SID Proposal: Study on New Radio Access Technology," 3GPP TSG RAN Meeting #71, RP-160671, Göteborg, Sweden (Mar. 7-10, 2016).
Rappaport et al., "Millimeter Wave Mobile Communications for 5G Cellular: It Will Work!," IEEE Access, vol. 1, pp. 335-349, (2013).
Rathinakumar et al., "Mutually orthogonal sets of ZCZ sequences," Electronics Letters, vol. 40, Issue 18 (Sep. 2004).
Sahin et al., "An Improved Unique Word DFT-Spread OFDM Scheme for 5G Systems," IEEE Globecom Workshops (Dec. 2015).
Third Generation Partnership Project, "Technical Specification Group Radio Access Network Small cell enhancements for E-UTRA and E-UTRAN—Physical layer aspects (Release 12)," 3GPP TR 36.872 V12.0.0 (Sep. 2013).
Third Generation Partnership Project, "Technical Specification Group Radio Access Network Small cell enhancements for E-UTRA and E-UTRAN—Physical layer aspects (Release 12)," 3GPP TR 36.872 V12.1.0 (Dec. 2013).
Third Generation Partnership Project, "Technical Specification Group Radio Access Network Evolved Universal Terrestrial Radio Access (E-UTRA); Radio Frequency (RF) system scenarios (Release 11)," 3GPP TR 36.942 V11.0.0 (Sep. 2012).
Third Generation Partnership Project, "Technical Specification Group Radio Access Network Evolved Universal Terrestrial Radio Access (E-UTRA); Radio Frequency (RF) system scenarios (Release 12)," 3GPP TR 36.942 V12.0.0 (Sep. 2014).
Third Generation Partnership Project, "Technical Specification Group Radio Access Network Evolved Universal Terrestrial Radio Access (E-UTRA); Radio Frequency (RF) system scenarios (Release 13)," 3GPP TR 36.942 V13.0.0 (Jan. 2016).
Third Generation Partnership Project, "Technical Specification Group Radio Access Network Evolved Universal Terrestrial Radio Access (E-UTRA); Multiplexing and channel coding (Release 12)," 3GPP TS 36.212 V12.6.0 (Sep. 2015).
Third Generation Partnership Project, "Technical Specification Group Radio Access Network Evolved Universal Terrestrial Radio Access (E-UTRA); Multiplexing and channel coding (Release 12)," 3GPP TS 36.212 V12.8.0 (Mar. 2016).
Third Generation Partnership Project, "Technical Specification Group Radio Access Network Evolved Universal Terrestrial Radio Access (E-UTRA); Multiplexing and channel coding (Release 13)," 3GPP TS 36.212 V13.3.0 (Sep. 2016).
Third Generation Partnership Project, "Technical Specification Group Radio Access Network Evolved Universal Terrestrial Radio Access (E-UTRA); Multiplexing and channel coding (Release 14)," 3GPP TS 36.212 V14.0.0 (Sep. 2016).
Third Generation Partnership Project, "Technical Specification Group Radio Access Network; Evolved Universal Terrestrial Radio Access (E-UTRA); Services provided by the physical layer (Release 12)," 3GPP TS 36.302 V12.5.0 (Sep. 2015).
Third Generation Partnership Project, "Technical Specification Group Radio Access Network; Evolved Universal Terrestrial Radio Access (E-UTRA); Services provided by the physical layer (Release 12)," 3GPP TS 36.302 V12.8.0 (Sep. 2016).
Third Generation Partnership Project, "Technical Specification Group Radio Access Network; Evolved Universal Terrestrial Radio Access (E-UTRA); Services provided by the physical layer (Release 13)," 3GPP TS 36.302 V13.3.0 (Sep. 2016).
Third Generation Partnership Project, "Technical Specification Group Radio Access Network; Evolved Universal Terrestrial Radio Access (E-UTRA); Services provided by the physical layer (Release 14)," 3GPP TS 36.302 V14.0.0 (Sep. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN) Overall description; Stage 2 (Release 13)," 3GPP TS 36.300 V13.1.0 (Sep. 2015).

(56) References Cited

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN) Overall description; Stage 2 (Release 13)," 3GPP TS 36.300 V13.5.0 (Sep. 2016).

Third Generation Partnership Project, "Technical Specification Group Radio Access Network; Evolved Universal Terrestrial Radio Access (E-UTRA) and Evolved Universal Terrestrial Radio Access Network (E-UTRAN) Overall description; Stage 2 (Release 14)," 3GPP TS 36.300 V14.0.0 (Sep. 2016).

Third Generation Partnership Project, "Technical Specification Group Radio Access Network; Evolved Universal Terrestrial Radio Access (E-UTRA); Layer 2—Measurements (Release 12)," 3GPP TS 36.314 V12.0.0 (Sep. 2014).

Third Generation Partnership Project, "Technical Specification Group Radio Access Network; Evolved Universal Terrestrial Radio Access (E-UTRA); Layer 2—Measurements (Release 13)," 3GPP TS 36.314 V13.1.0 (Mar. 2016).

* cited by examiner

WAVEFORM BASED DATA INTEGRITY CHECK AND ERROR CORRECTION

CROSS REFERENCE TO RELATED APPLICATIONS

This application is the U.S. National Stage, under 35 U.S.C. § 371, of International Application No. PCT/US2016/069390 filed Dec. 30, 2016, which claims the benefit of U.S. Provisional Application Ser. No. 62/273,966 filed Dec. 31, 2015, the contents of which are hereby incorporated by reference herein.

BACKGROUND

Frequency-division multiple access (FDMA) or orthogonal frequency-division multiplexing (OFDM) waveforms that utilize zero tail (ZT) or unique words (UW) are candidates for wireless waveforms. ZT or UW may be used in place of redundancy schemes such as cyclic prefixes (CPs) or null subcarriers as a more resourceful and energy efficient option. Waveforms that utilize ZT or UW may achieve high reliability, low peak-to-average power ratio (PAPR) characteristics, lower out-of-band (OOB) leakage, very high data rates, and deliver better quality of service (QoS).

Systems configured with waveforms that utilize ZTs, UWs, or CPs will require error detection (ED) or error checking (EC) to meet reliability requirements of next generation devices while maintaining high throughput or coding rates. The ED or EC system may also need to be flexible in order to handle different devices such as machine-to-machine (M2M), machine type communications (MTC), wearable devices, Internet of things (IoT), or the like and corresponding frame structures.

Thus, it is desirable to have efficient data integrity checks, EC, or ED for ZT, UW, and CP based waveforms that increases reliability, provides flexibility, maintains high coding rates, and is adaptable to different device types.

SUMMARY

Error detecting may be performed on a received waveform prior to channel decoding such that when a packet(s) is successfully detected by a pre-decoder data check the channel decoding may be bypassed. If packet decoding is unsuccessful by the pre-decoder data check, channel decoding and error checking may be performed. The pre-decoder data check may utilize an existing or a derived signal that may explicitly or implicitly indicate an error check pass/successful or fail/unsuccessful condition.

BRIEF DESCRIPTION OF THE DRAWINGS

A more detailed understanding may be had from the following description, given by way of example in conjunction with the accompanying drawings wherein.

DETAILED DESCRIPTION

For the methods and processes described below, the steps recited may be performed out of sequence in any order and sub-steps not explicitly described or shown may be performed. In addition, "coupled", "operatively coupled", "in communication", etc. may mean that objects are linked or communicate but may have zero or more intermediate objects between the linked objects. Also, any combination of the disclosed features/elements may be used in one or more embodiments. When referring to "A or B", it may include A, B, or A and B, which may be extended similarly to longer lists. When using the notation X/Y it may include X or Y. When using the notation X/Y it may also include X and Y. X/Y notation may be extended similarly to longer lists with the same aforementioned logic.

Any elements shown or described in the figures herewith may be implemented by one or more functions or components on hardware, software, firmware, or the like. Moreover, in the examples herewith, a transmitter may be part of a transceiver or multi-component hardware, as desired. A receiver may be part of a transceiver or multi-component hardware, as desired. Lastly, the term data or information in any of the examples herewith may include control data, control information, a control packet(s), user data, user information, payload data, payload information, a data packet(s), general data, or general information.

Figure 1A:
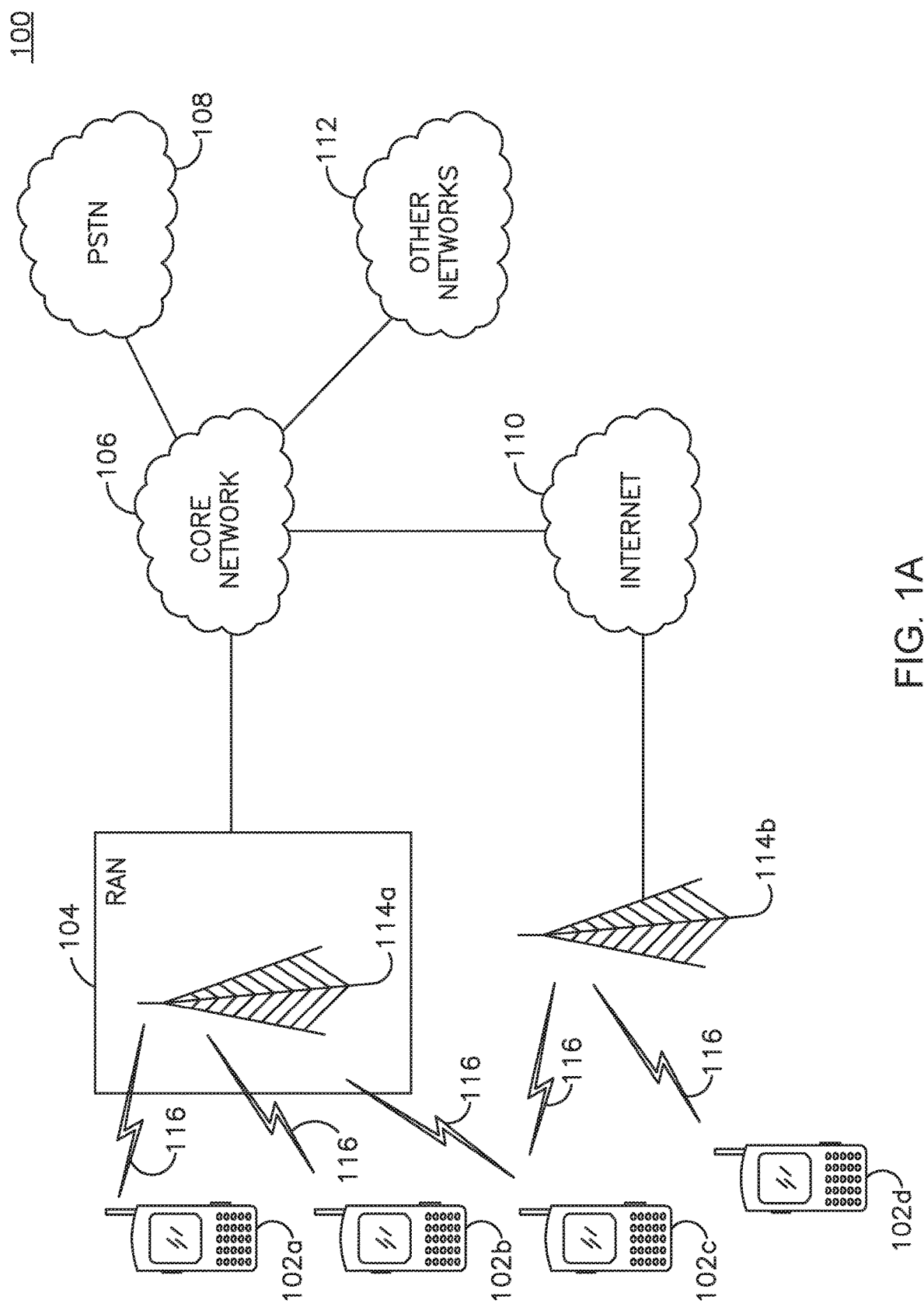
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (W-CDMA). W-CDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), cdma2000, cdma2000 1x, cdma2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., W-CDMA, cdma2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
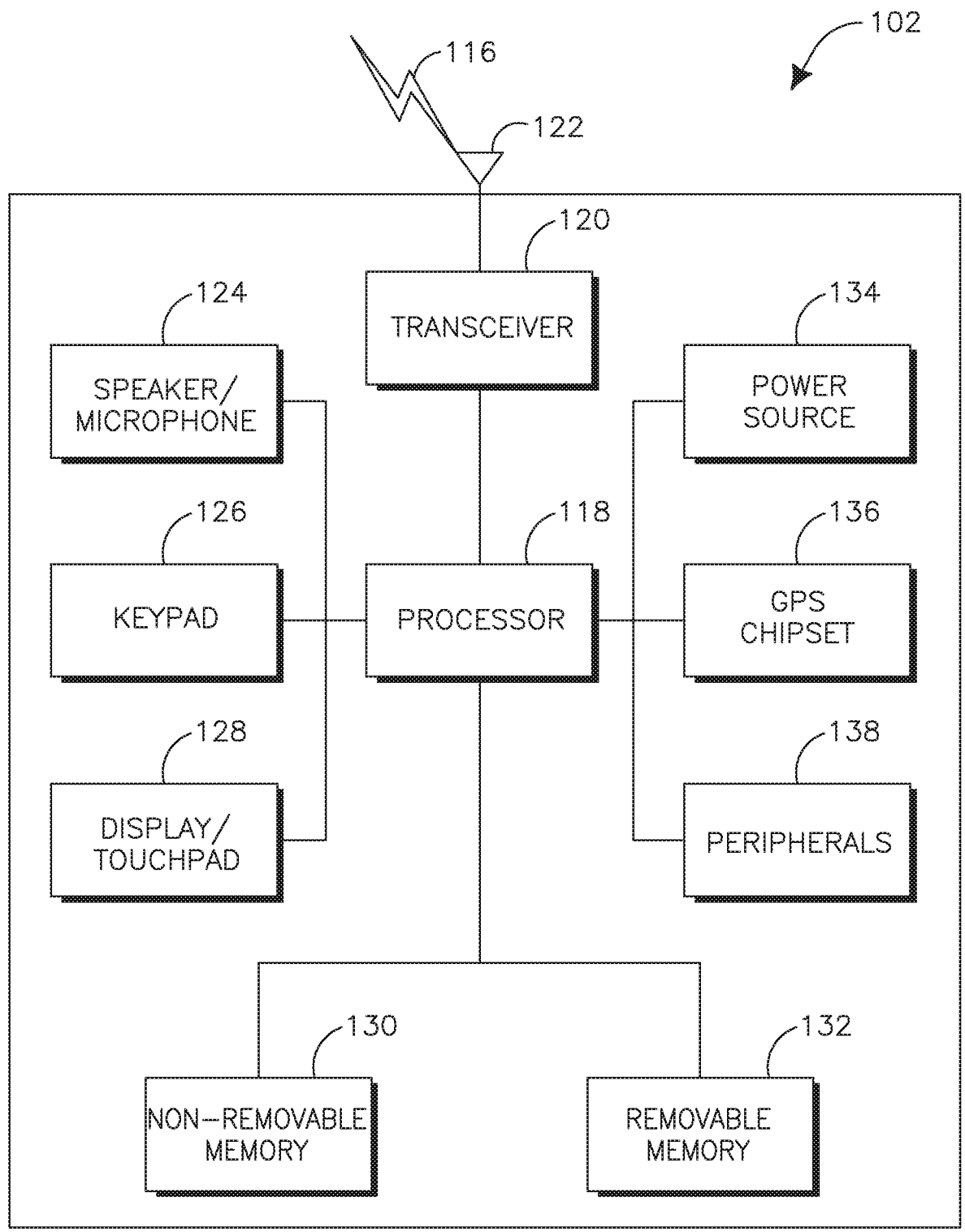
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 133. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NIMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
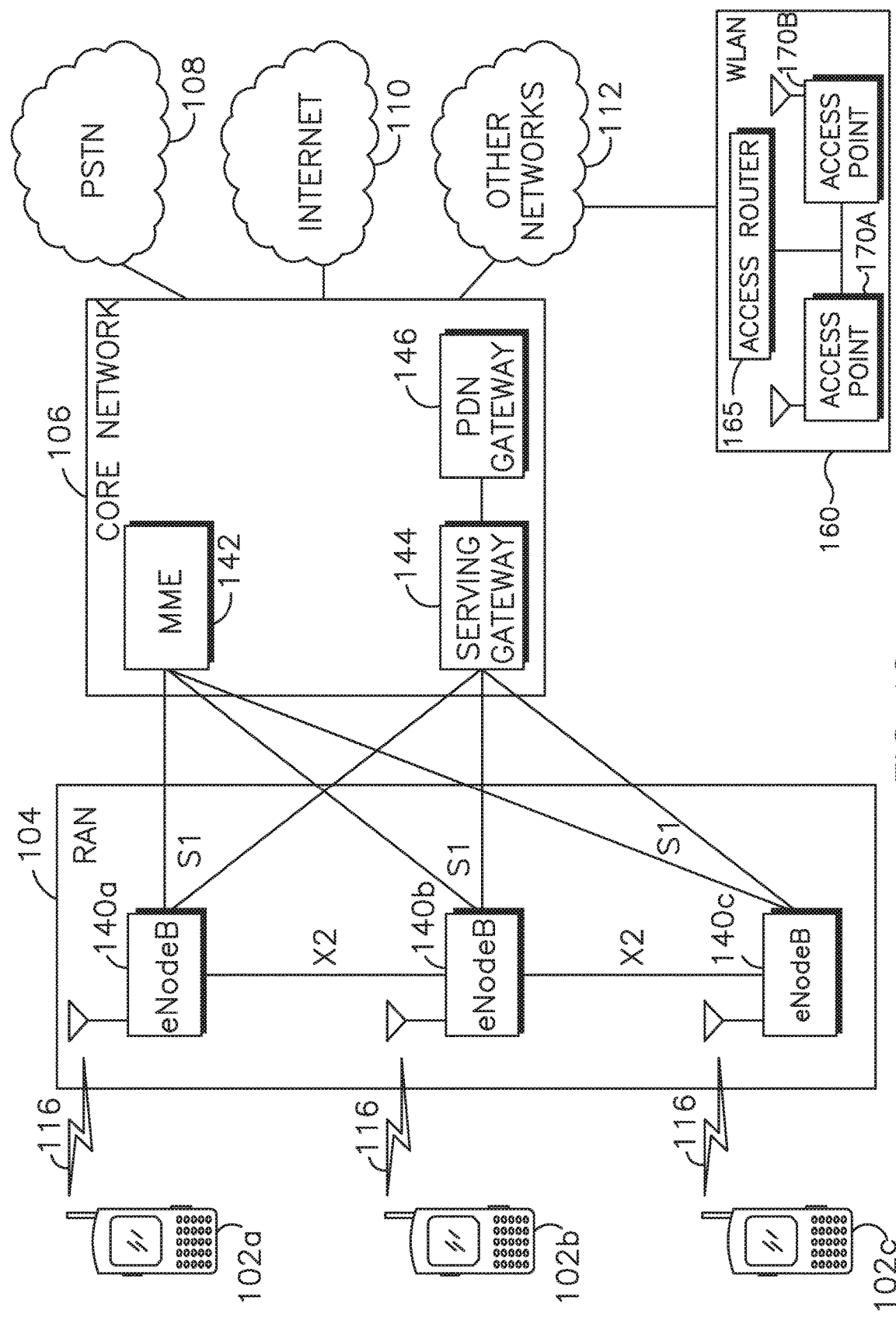
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or W-CDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

To save power, reduce complexity, and reduce latency channel decoding may be skipped or bypassed at a receiver or transceiver if a received packet, frame, or channel transmitted on a generic or unique word-error checking (UW-EC) waveform is successfully detected for the examples given herewith. Channel decoding may also be skipped or bypassed if an error(s) is detected before channel decoding for the examples given herewith.

Wireless applications and devices may require Gbits/sec of throughput, simple architecture, operation in high traffic density areas, very low latency, and very low power consumption. Such applications or devices may include tactile internet, Internet of Things (IoT), sensors, mission-critical communications (MTC), millimeter wave (mmWave) systems, ultra-reliable and low latency communications (URLLC), enhanced mobile broadband (eMBB), or the like. To meet this requirement, an enhancement to $5^{th}$ Generation (5G) radio access networks includes new radio waveforms.

Orthogonal frequency-division multiplexing (OFDM) is being utilized in LTE, Wi-Fi, 802.11x, or the like networks due to being able to convert a frequency selective channel(s) into smaller flat fading subchannels. Flat fading subchannels may desirably allow simpler or one-tap equalization per subchannel at a receiver or transceiver. As an OFDM variant, DFT-s-OFDM improves the peak to average power ratio (PAPR) of OFDM by spreading a data sequence(s) with a DFT before the spread signal is added to subchannels.

Both OFDM and discrete Fourier transform spread OFDM (DFT-s-OFDM) may utilize a cyclic prefix (CP) to prevent or reduce inter-symbol interference (ISI) that may occur due to different channel delay spreads and to maintain symbol cyclicity. The length of a CP may be fixed and based on a maximum delay spread of a channel or cell for system simplicity. As a result, spectral efficiency may be lost when the delay spread of a channel is smaller than a CP duration. The efficiency loss may be significant with large variances in the root mean square (RMS) delay spread of the channel. For example, in mmWave channels, the delay spread may be below 4 nanoseconds (ns) for indoor channels in line of sight (LOS) conditions, and up to 70 ns for indoor non-line of sight (NLOS) conditions. Since changing a CP size may change the number of OFDM symbols in a sub-frame, a system configured or supporting many different CP sizes can add processing complexity for a fixed sub-frame duration or time interval.

Zero tail (ZT) DFT-s-OFDM or unique word (UW) OFDM waveforms may be configured to efficiently adapt or handle variable CP sizes, variable channel delay spreads, variable cell sizes, or the like. A ZT DFT-s-OFDM waveform may also decouple from channel characteristics in certain configurations and duration of a ZT may be dynamically adapted to a channel delay spread, without change to an OFDM symbol duration. Lastly, the ZT may be used as a gap for beam switching, uplink (UL)/downlink (DL) switching, interference measurement in mmWave channels, or the like.

Figure 2:
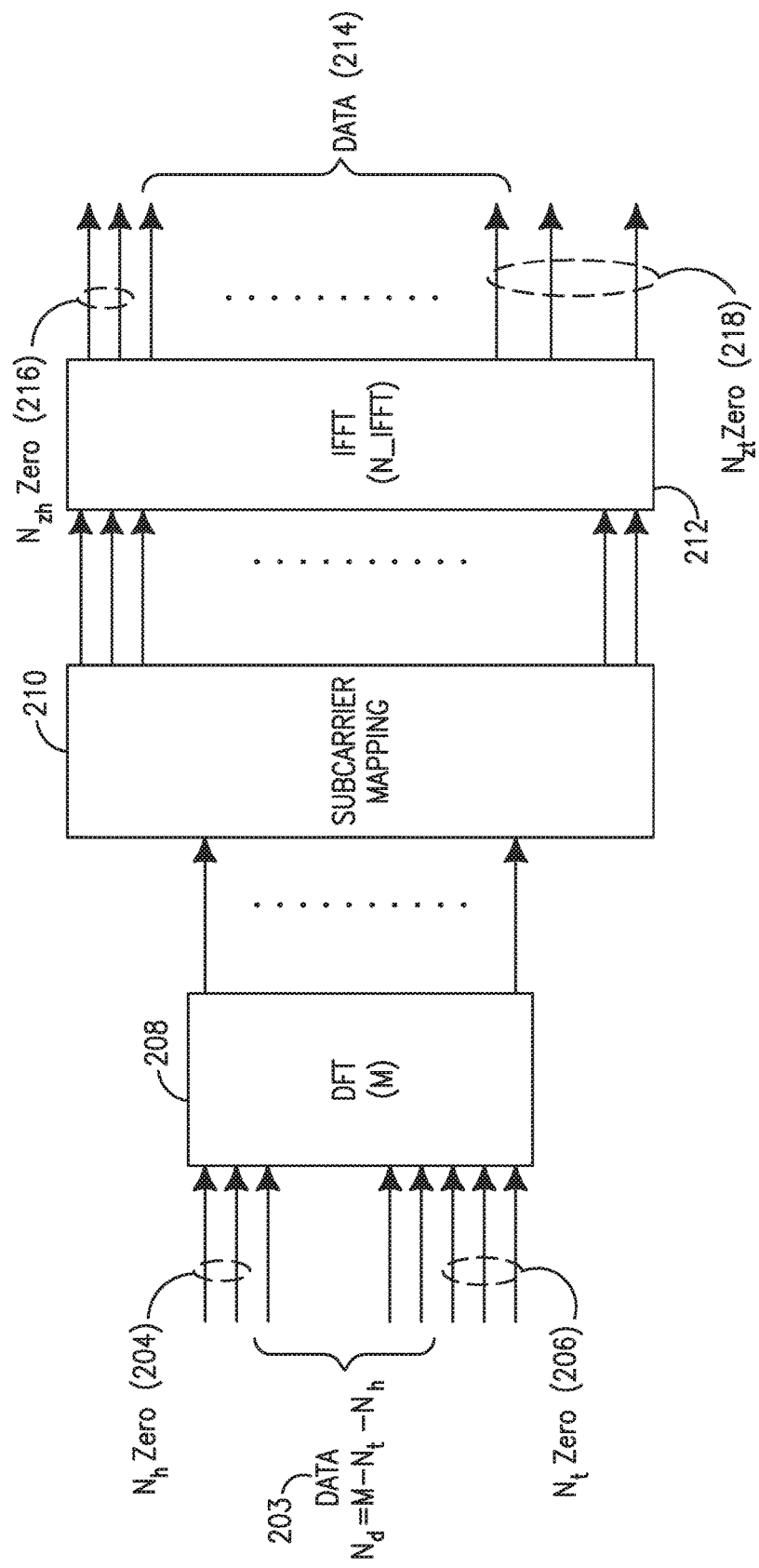
FIG. 2 is a diagram of a zero tail (ZT) discrete Fourier transform (DFT) spread orthogonal frequency division multiplexing (s-OFDM) (DFT-s-OFDM) transmitter.

FIG. 2 is a diagram of a ZT DFT-s-OFDM transmitter 202. In ZT DFT-s-OFDM, a ZT may be generated by adding zeros to the head as $N_h$ Zero (204) and tail as $N_t$ Zero (206) of DFT spreading component or function 208. Data (203) may be represented as $N_d = M - N_t - N_h$. The bits outputted by DFT spreading component or function 208 may be mapped to subcarriers by subcarrier mapping component or function 210. The size of DFT spreading component or function 208 may be represented as M and the inverse fast Fourier transform (IFFT) component or function 212 as N_IFFT. Correspondingly, at the output of IFFT component or function 212, there may be M data symbols 214 and (N_IFFT/M−1) interpolated samples. With this configuration, zero inputs to DFT spreading component or function 208 may be distributed on head $Nz_h$ Zero (216) and tail $N_{Zt}$ Zero (218) of data symbol 214 at the output of IFFT component or function 212.

A tail may not become an exactly or substantially perfect zero due to interpolation of samples. Since interpolated samples may also be data dependent, the zero tail may be different between DFT-s-OFDM symbols resulting in loss of the desirable cyclic property of an OFDM signal and may result in greater ISI. Correspondingly, for certain data types a ZT DFT-s-OFDM signal may have a bit error rate (BER) floor at a high signal-to-noise ratio (SNR) in high delay spread channels.

Figure 3:
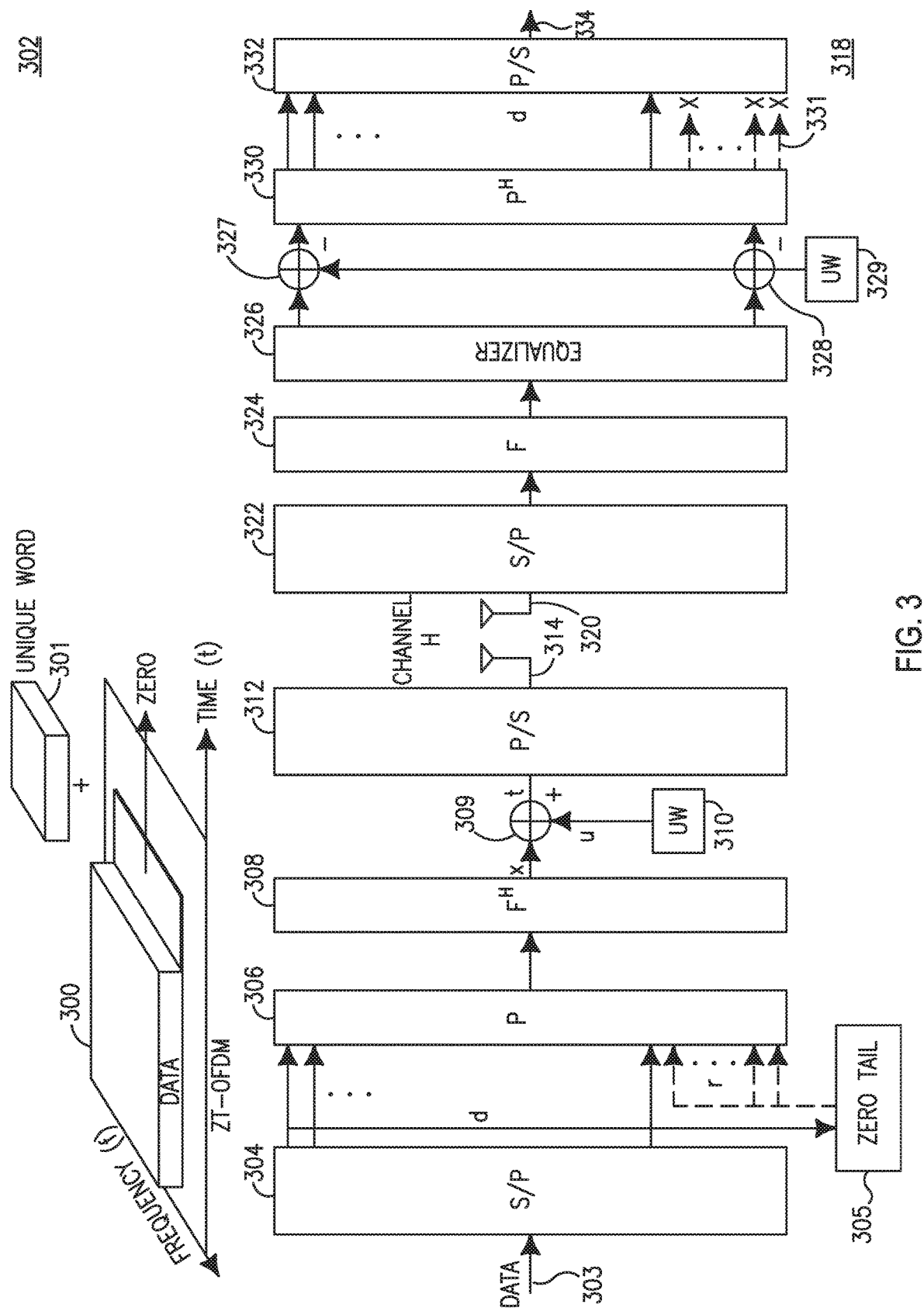
FIG. 3 is a diagram of a unique word (UW)-OFDM transmitter and receiver.

FIG. 3 is a diagram of a unique word (UW)-OFDM transmitter 302 and receiver 318. By adding UW 301 to data symbol(s) 300 at transmitter 302, a tail or head of each OFDM block or symbol may have substantially zero, perfect zero, near zero, or zero samples. UW 301 may utilize a constant tail for each block or symbol such that a channel may be converted from a linear convolution to a circular convolution allowing simpler receiver/transceiver structures and operations. In addition, UW 301 may be utilized as a training field at a receiver to track phase drifts, multipath delays, or the like.

At transmitter 302, data 303 may be converted to a parallel stream by serial-to-parallel (S/P) converter component or function 304. Data vector(s) d may be outputted by S/P component or function 304 and signaled or provided to a permutation matrix P component or function 306. Data vector(s) d may also be signaled or provided to zero tail generator component or function 305 to produce redundant subcarrier(s) r to generate zero, perfect zero, near zero, or zero samples at the tail of an OFDM block or symbol. Redundant subcarrier(s) r may be modulated with values generated by zero tail generator component or function 305. Permutation matrix P component or function 306 may map elements of redundant subcarriers r and data vector(s) d to be converted to the time domain by inverse DFT component or function 308 producing output signal x.

A fixed UW vector u, generated by UW component or function 310, may be added by addition component or function 309 to the tail of output signal x to produce signal t. Signal t is parallel-to-serial converted by parallel-to-serial (P/S) component or function 312 to be subsequently transmitted using antenna 314. Transmissions by transmitter 302 may go over channel H to receiver 318 and received by antenna 320. Signals received by receiver 318 may be processed by S/P component or function 322 to generate a parallel information stream that is converted to the frequency domain by DFT component or function 324 and equalized in the frequency domain by frequency domain equalizer (FDE) component or function 326. A UW may be outputted by UW component or function 329 and subtracted from the output signal(s) of FDE component or function 326 by subtraction components or functions 327 and 328. Inverse permutation matrix component or function 330 may utilize the outputs of subtraction components or functions 327 and 328 to recover data vector(s) d and signals X 331. Data vector(s) d are converted to a serial stream 334 by P/S component or function 332.

In certain configurations, the norm of redundant subcarrier(s) r may be large for UW OFDM signals or waveforms, resulting in high power consumption at transmitter 302 and possible distortion due to quantization error(s). Permutation matrix P component or function 306 may be optimized by changing or alerting location of redundant subcarriers to reduce large values of redundant subcarrier(s) r and signal distortion. Reduction of large values and optimization may also be achieved through heuristic algorithms for permutation matrix P component or function 306 or adjustments to all allocated subcarriers to generate the ZT for output signal x. However, altering all subcarriers to generate the ZT may result in a more complicated receiver structure at receiver 318.

Figure 4:
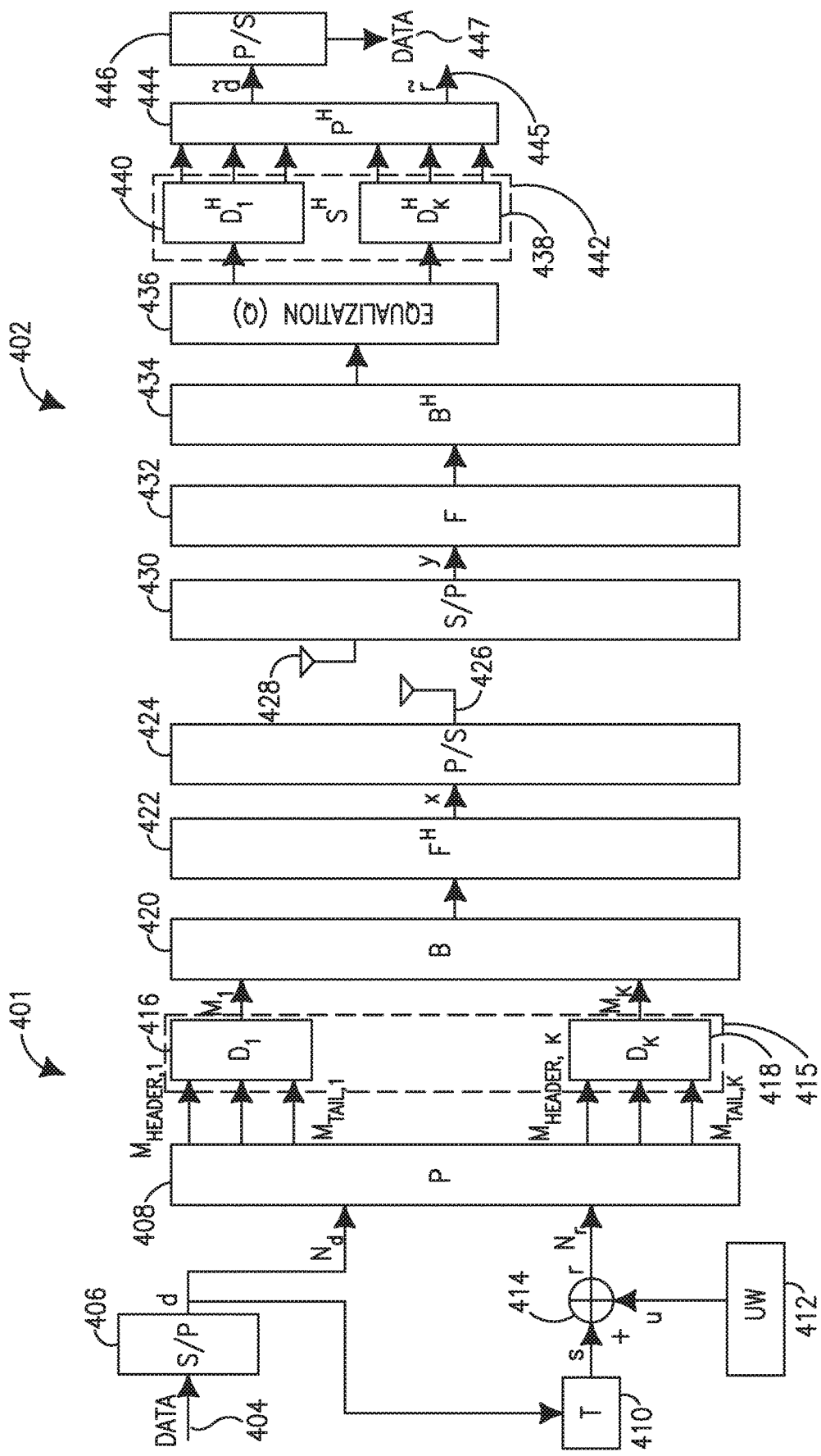
FIG. 4 is a diagram of a UW DFT-s-OFDM transmitter and receiver that may utilize non-zero redundant symbols.

FIG. 4 is a diagram of a UW DFT-s-OFDM transmitter 401 and receiver 402 that may utilize non-zero redundant symbols. UW DFT-s-OFDM waveforms may utilize pulse shaping to reduce energy consumption caused by a UW. Similar to ZT DFT-s-OFDM, data symbols in UW DFT-s-OFDM may be mapped to a middle portion of DFT spreading blocks 415. In addition, rather than placing zero redundant symbols at either or both ends of DFT spreading blocks 415, non-zero redundant symbols may be utilized to suppress any leaked energy at a tail of a waveform at transmitter 401.

UW DFT-s-OFDM waveforms may consume very low energy for zeroing out tails that may result in lower ISI in high multipath distortion environments, low PAPR, and lower out-of-band (OOB) emissions. In addition, since a UW may be inserted at input(s) DFT spreading blocks 415, receiver 402 may be able to remove the UW and data symbols with reduced complexity and without extra operation(s). As a result, UW DFT-s-OFDM waveforms may be decoded by any DFT-s-OFDM receiver. Therefore, a DFT-s-OFDM receiver or transceiver may in part decode both a UW DFT-s-OFDM waveform or DFT-s-OFDM waveform.

At transmitter 401, data 404 may be converted by S/P component or function 406 to generate data vector(s) d. Transmitter 401 may generate suppressed DFT-s-OFDM symbols at a tail(s) of one or more DFT-s-OFDM symbol(s) using tail suppression component or function 410. Similarly, suppressed DFT-s-OFDM symbols at a head(s) of one or more DFT-s-OFDM symbol(s) may be arranged or configured by transmitter 401 on data 404.

Suppression signal s may be combined with UW u by addition component or function 414 to generate suppressing vector(s) r that provides zero tail(s) to data vector(s) d. UW u may be generated by UW component or function 412. At transmitter 401, $N_d$ represents the number of modulation symbols and $N_r$ may be available dimensions for tail suppression component or function 410.

Permutation matrix P component or function 408 may be utilized to map modulation symbols and elements of suppressing vector(s) r to the input(s) of DFT spreading blocks 415 comprised of sub-spreading matrices $D_1$ 416 to $D_K$ 418. Sub-spreading matrices $D_1$ 416 to $D_K$ 418 may modulate data symbols using values generated by tail suppression component or function 410. Lower end DFT sub-spreading matrices $D_K$ 418 may be configured to generate $M_K$ using $M_{header,K}$ and $M_{tail,K}$. Upper end DFT sub-spreading matrices $D_1$ 416 may generate $M_1$ using $M_{header,1}$ and $M_{tail,1}$.

Output(s) of DFT spreading blocks 415 may be shaped in the frequency domain by shaping matrix component or function 420 to construct a matrix B for different pulse shapes and converted to the time domain by inverse DFT component or function 422. Output signal x is generated and transmitted using antenna 426 after parallel-to-serial conversion by P/S component or function 424.

UW-DFT-s-OFDM receiver 402 may perform substantially the reverse operations of transmitter 401 while considering the impact of a communication channel. Antenna 428 receives transmissions by transmitter 401. Received signals are serial-to-parallel converted by S/P component or function 430 to produce vector(s) y that is processed by DFT F component or function 432. The output(s) of DFT F component or function 432 may be signaled or provided to receiver shaping matrix $B^H$ 434 for shaping and subsequent equalization by FDE component or function 436. FDE component or function 436 may utilize of any one of a minimum mean square error (MMSE), zero forcing, best linear minimum unbiased estimators (BLUE), or the like function.

Despreading blocks 442 may be comprised of sub-despreading matrices $D_1^H$ 440 to $D_K^H$ 438 that compose matrix $S^H$ to despread the output(s) of FDE component or function 436. Despreading blocks 442 communicate results to inverse or receiver permutation matrix 444 using matrix $P^H$ in order to recover data vector(s) $\bar{d}$ and signal $\bar{x}$ 445. Data vector(s) $\bar{d}$ may be parallel-to-serial converted by P/S component or function 446 to produce data 447.

In the forthcoming examples, error detecting may be performed on a received waveform prior to channel decoding such that when a packet(s) is successfully detected by a pre-decoder data or data integrity check channel decoding may be bypassed. If packet decoding is unsuccessful by a pre-decoder data integrity check, channel decoding and error checking may be performed. The pre-decoder data integrity check may utilize an existing or a derived signal that may explicitly or implicitly indicate an error check pass/successful or fail/unsuccessful condition.

A generic pre-decoder data integrity check mechanism may be used for a data packet, control packet, data channel, control channel, broadcast channel or the like, or any combination of therefor. The generic pre-decoder data integrity check mechanism may be applied to UL or DL channels.

Also in the examples forthcoming, codebook based error check or error checking encoding may be utilized. A codebook may utilize spreading codes, masking, orthogonal codes, or the like to add EC bits to UW waveforms to generate UW-EC waveforms. In addition, error checking or error check bits may be configured to be built into a UW-EC waveform. A UW-EC may be a sequence(s), including orthogonal, which may carry or embed certain EC bits into a UW waveform.

A UW-EC sequence may be selected according to an error checking function (ECF). An ECF may generate EC bits from systematic bits by adding EC capability to data, CRC, or data and CRC as desired. ECF may use a parity check function, CRC function, or the like. UW-EC may be transmitted with a UW-based waveform. A UW or UW-based waveform may be one or any combination of UW-OFDM, ZT-OFDM, ZT FDMA, UW DFT-s-OFDM, or the like waveforms.

Codebook based error checking or a pre-decoder data integrity check may also be applicable to CP-based OFDM or DFT-s-OFDM waveforms where an EC sequence may be transmitted as a fixed or known set of sequences. For example, a reference signal may be used to transmit an EC sequence as a fixed or known set of sequences in but not limited to CP-based OFDM or DFT-s-OFDM waveforms. Zadoff-Chu sequences with cyclic shifts may also be used to transmit an EC sequence. A reference signal may be a dedicated reference signal, a demodulation reference signal (DMRS), a sounding reference signal (SRS), a beam reference signal (BRS), a mobility reference signal (MRS), or the like. Sequences other than Zadoff-Chu sequences with or without cyclic shifts may also be used to transmit an EC sequence or EC bits.

Figure 5:
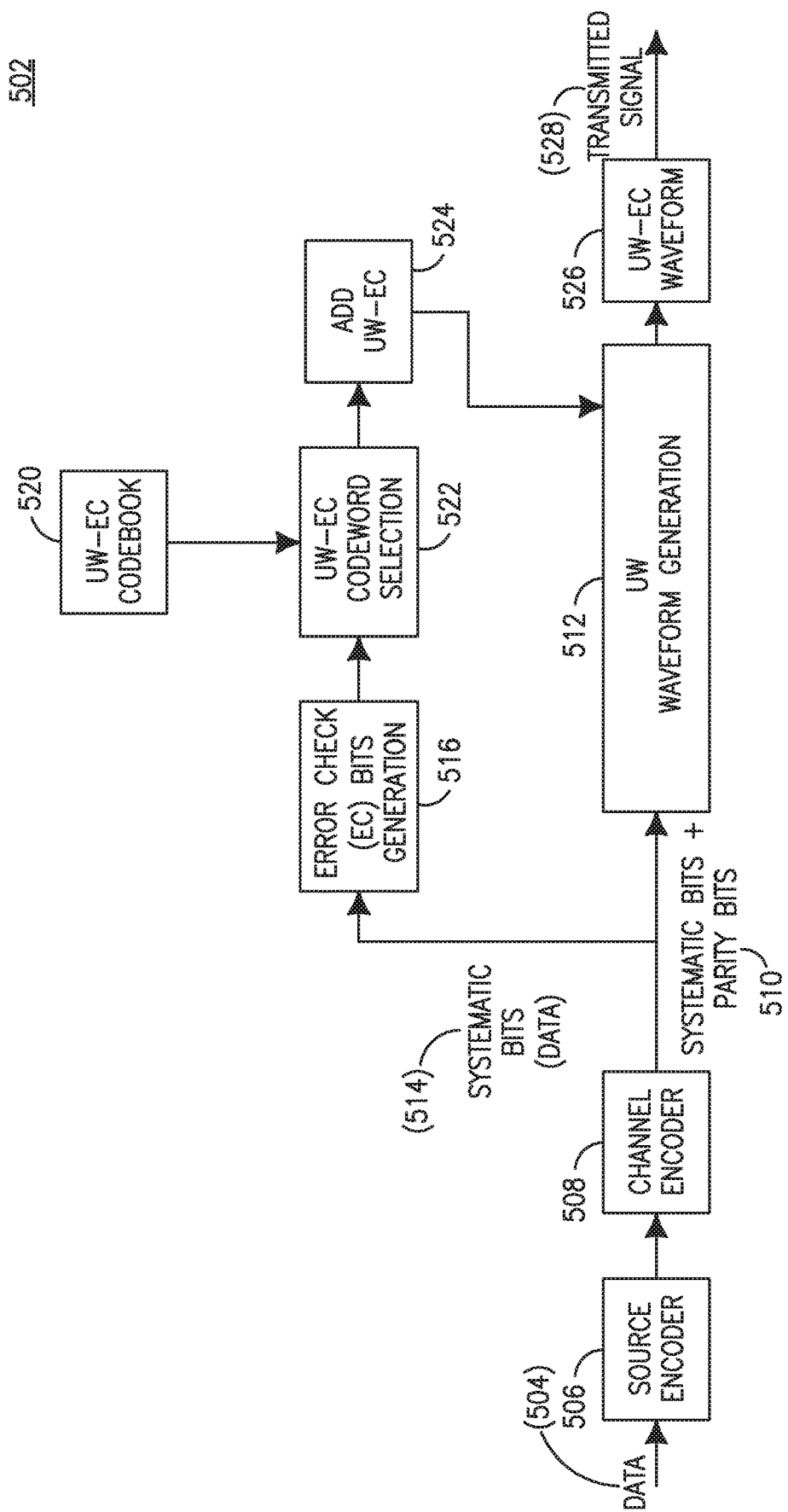
FIG. 5 is a diagram of a transmitter for a unique word error check (UW-EC) waveform.

FIG. 5 is a diagram of a transmitter 502 for a UW-EC waveform. An error check function (ECF) may be pre-defined or configured to generate EC bits from systematic bits by adding EC capability to data. At transmitter 502, instead of a CRC, it may be desirable to utilize a UW(s) for error checking since a UW is already available and may reduce overhead if UW is used to replace or assist CRC for error checking. Codebook based UW-EC may also be desirable since error checking may be performed before decoding so that decoding latency can be reduced or removed at a receiver or transceiver. In addition, backwards compatibility with existing CRC checks may be desirably maintained if a UW is used in addition to CRC for enhanced error checking.

Data 504 may be signaled to source encoder 506 and signaled to channel encoder 508 to generate systematic bits 514. Data 504 may be a data packet, control packet, or any combination thereof related to transmissions by a data channel(s), a control channel(s), a broadcast channel(s), or the like in any combination in either the UL or DL. In transmitter 502, systematic bits 514 may be generated without a cyclic redundancy check (CRC) or parity bits. Systematic bits 514 may be generated by a channel encoder 508. Channel encoder 508 may be a channel encoder using systematic channel codes, such as systematic polar codes, low-density parity-check (LDPC), turbo codes, convolutional codes, block codes or any combination of thereof. Systematic or data bits without a CRC may be signaled to EC bit generator 516 to add EC capability by generating EC bits. EC bits may be used to select a UW-EC codeword, such as u or c, at UW-EC codeword selection component or function 522 from a UW-EC codebook component or function 520.

UW waveform generator component or function 512 may generate a UW waveform based on systematic and parity bits 510 from channel encoder 508. UW waveform may be generated as described for transmitter 302, transmitter 401, or the like. A UW-EC codeword may be selected to generate a UW-EC sequence(s) which may be added by UW-EC component or function 524 to a signal at UW waveform generator component or function 512 by either inserting c or adjusting u. When adjusting u, the condition in Equation (1) may be needed:

$$M_{22}u = c. \qquad \text{Equation (1)}$$

A UW-EC waveform may be generated by UW-EC waveform component or function 526 to be sent as transmitted signal 528.

Figure 6:
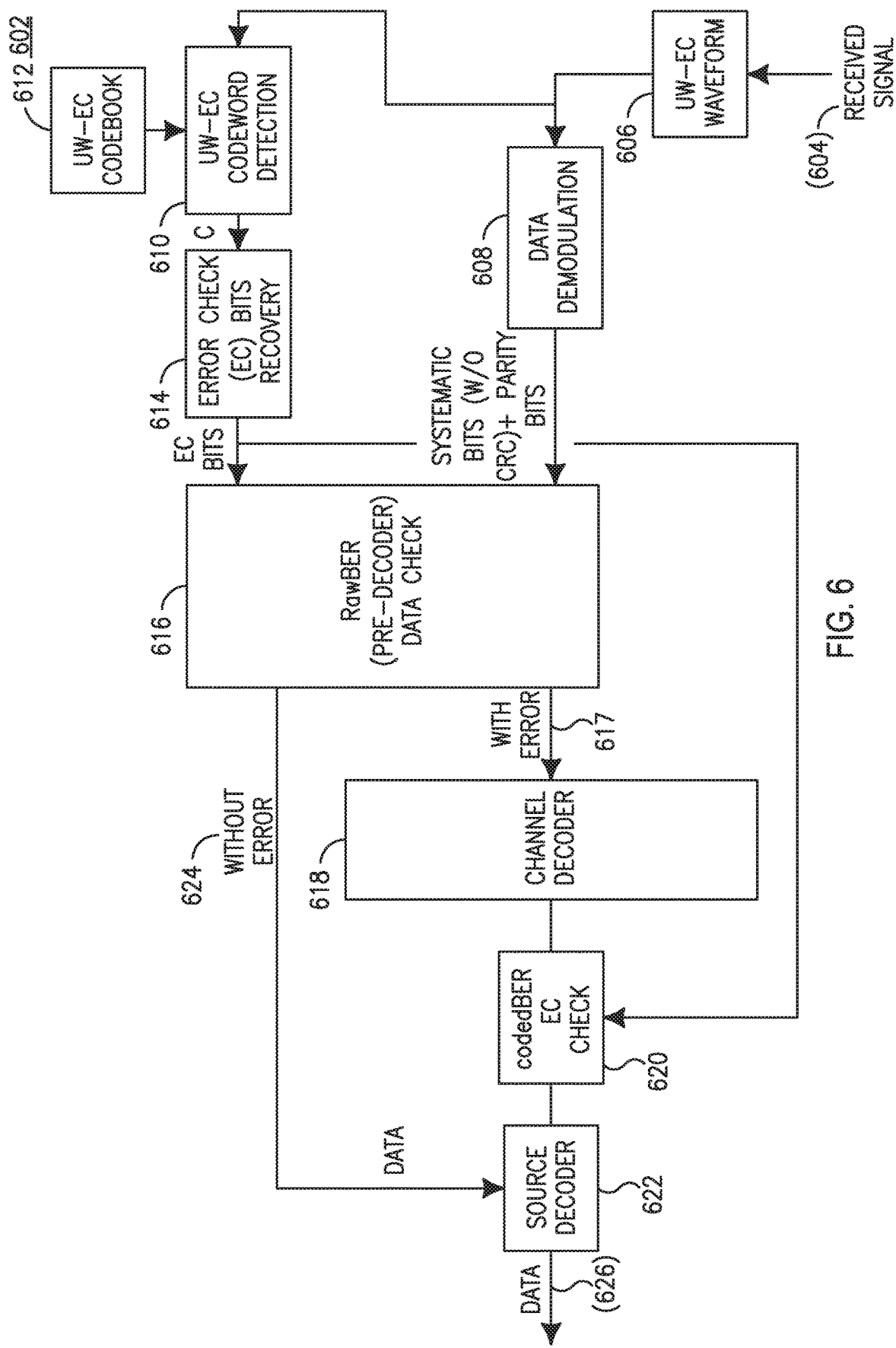
FIG. 6 is a diagram of a receiver for a UW-EC signal(s) data check.

FIG. 6 is a diagram of receiver 602 for a UW-EC signal(s) data check. A received signal 604 is processed by UW-EC waveform component or function 606 to detect a UW-EC sequence(s) and provide a signal to data demodulation component or function 608. UW-EC waveform component or function 606 also provides a signal to UW-EC codeword detection component or function 610. A UW-EC codeword c may be detected by UW-EC codeword detection component or function 610 using UW-EC codebook component or function 612. Receiver 602 may communicate with transmitter 502 such that UW-EC codebook component or function 612 may be synchronized with UW-EC codebook component or function 520. In addition, the codebook(s) may be pre-defined or configured such that receiver 602 may decode received signal 604 using blind detection algorithms.

EC bits are generated from codeword c by EC bits recovery component or function 614. If successful packets or channel data can be detected before channel decoding by Raw bit error rate (BER) pre-decoder data check component or function 616 utilizing EC bits and systematic bits without CRC and parity bits signaled or fed by data demodulation component or function 608, processing by channel decoder 618 may be bypassed. For any of the examples given herewith, a pre-decoder data check may be interchangeably used with a pre-decoder data integrity check. Skipping or bypassing channel decoding may reduce complexity, power consumption and latency at receiver 602. Instead, data without error(s) 624 may be signaled to source decoder 622 to output data 626. Channel decoder 618 may be configured to perform turbo decoding, convolutional decoding, LDPC channel decoding, polar decoding, systematic polar decoding, block decoding, or the like.

If RawBER pre-decoder data check component or function 616 cannot successfully detect packets or channel data, channel decoding or additional error checking may be needed at receiver 602. Demodulated data-by-data demodulation component or function 608 may be signaled as systematic bits without CRC and parity bits and utilized by RawBER pre-decoder data check component or function 616 to signal data with error(s) 617 to channel decoder 618. Channel decoded data may be signaled to codedBER based EC check component or function 620 that utilizes EC bits to output a signal for source decoder 622 to process and source decode to output data 626.

Receiver 602 may be configured to utilize multi-tier data error checking. For instance, when using 2-tiers, a first tier data error check may comprise a coarse data error check. At the first tier, if no error(s) is detected, receiver 602 may bypass processing by channel decoder 618 and skip a second tier or fine data error check. Correspondingly, data without error(s) 624 is signaled to source decoder 622. If a first tier or coarse data error check is unsuccessful, receiver 602 may perform the channel decoding and a second tier or fine data error check.

First tier or coarse data error checking may be performed by RawBER pre-decoder data check component or function 616. Second tier or fine data error checking may be performed by codedBER EC check component or function 620 after channel decoding by channel decoder 618. Second tier or fine data error checking may not be utilized unless there is a data error(s) detected by the first or coarse tier data error check. In addition, utilizing a codedBER EC check component or function 620 after channel decoding may improve packet error rate (PER) or Block Error Rate (BLER) performance when a data error(s) is detected by RawBER pre-decoder data check component or function 616.

Receiver 602 may utilize a channel quality indicator (CQI) or signal-to-interference-plus-noise ratio (SINR) pre-decoder data check. CQI or SINR may be utilized to indicate or determine channel conditions experienced by received signal 604. For CQI based receivers, if a CQI value(s) is substantially high or beyond a threshold, better channel conditions may be inferred and a probability of passing an error check may be higher. Moreover, a CQI pre-decoder data check may be configured without link-adaption at receiver 602 so that CQI may be used to indicate a pass, successful, fail, unsuccessful, or the like condition of an error check without maintaining a PER or BLER to a fixed, set, or predetermined value.

CQI ranges may be utilized for CQI pre-decoder data checks. A CQI range(s) may be predetermined, signaled, negotiated with a transmitter, pre-defined, indexed in a CQI table, or the like. CQI ranges or related thresholds may also be based on simulation, dynamic, adjustable, based on system throughput, based on BLER, based on buffer occupancy, based on buffer status, determined using SINR values, or the like. When a CQI value is substantially within a range, a pre-decoder data check may be performed. Otherwise, a pre-decoder and post-decoder data check may be used or data may be discarded prior to any channel decoding.

As an example, receiver 602 may be configured to use two CQI ranges. A high CQI range may be defined to indicate favorable or desirable channel conditions and a low CQI range may be defined to indicate unfavorable or undesirable channel conditions. If measured CQI is substantially within a high CQI range, then receiver 602 may perform a coarse or first tier pre-decoder data check without channel decoding at channel decoder 618 and signal data without error(s) 624 to source decoder 622 to generate or recover output data 626. If measured CQI is substantially within a low CQI range, fine or second tier channel decoding may be performed at channel decoder 618 and error checking at codedBER EC check component or function 620 to subsequently generate or recover output data 626.

As another example, receiver 602 may be configured to use three CQI ranges: A high CQI range to indicate favorable or desirable channel conditions and a very high possibility to pass or succeed a data check; a low CQI range indicating to indicate unfavorable or undesirable channel conditions and a low possibility to pass or succeed a data check; and a very low CQI range indicating substantially worst channel conditions and data check cannot pass or succeed. If measured CQI is substantially within a high CQI range, then receiver 602 may perform a coarse or first tier pre-decoder data check without channel decoding at channel decoder 618 and signal data without error(s) 624 to source decoder 622 to generate or recover output data 626. If measured CQI is substantially within a low CQI range, fine or second tier channel decoding may be performed at channel decoder 618 and error checking at codedBER EC check component or function 620 to subsequently generate or recover output data 626. If measured CQI is substantially within a very low CQI range, receiver 602 may discard the packet(s). The examples given herewith to utilize CQI may similarly operate where SINR is utilized as a metric to determine when to perform channel decoding.

Receiver 602 may provide fast or low latency hybrid automatic repeat request (HARQ) by bypassing or skipping channel decoding at channel decoder 618. A pre-decoder data check may also lead to early-detection of a successful data packet(s), data block(s), data segment(s), or the like such that HARQ latency may be reduced. As an example, a multi-tier HARQ data check may be configured. At receiver 602, upon receiving a data packet, a pre-decoder error check may be performed by either a UW-EC data check at RawBER pre-decoder data check component or function 616. If a pre-decoder error check is passed or successful, receiver 602 may trigger a first tier HARQ without channel decoding or further (e.g., second tier) HARQ processing. A positive acknowledgement (ACK) may also be communicated to transmitter 502. If a pre-decoder error check is unsuccessful or fails due to an error(s), receiver 602 may perform channel decoding at channel decoder 618 and perform a second tier HARQ. Receiver 602 may subsequently feedback an acknowledgement (ACK) or negative acknowledgement (NACK) based on CRC check to transmitter 502.

A first tier HARQ may be configured or designated as a fast HARQ pre-decoder data check such that HARQ latency and power consumption is reduced when bypassing channel decoding and a CRC check. A second tier HARQ may also include a post-decoder data integrity check and maintain backward compatibility to legacy HARQ procedure(s) if an error(s) is detected by a pre-decoder data check entity.

Figure 7:
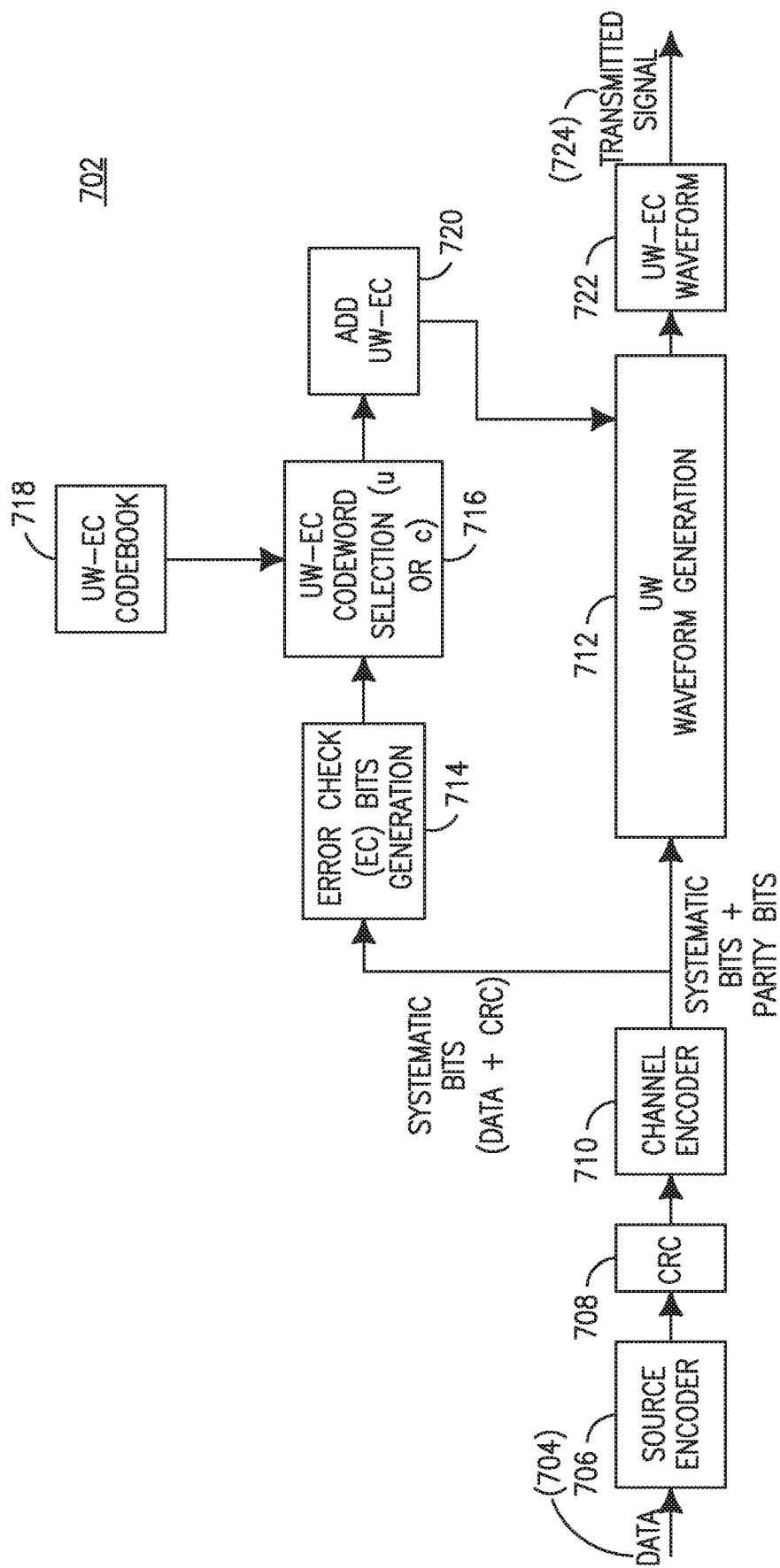
FIG. 7 is a diagram of a transmitter for a UW-EC cyclic redundancy check (CRC) (UW-EC-CRC) signal(s) diversity.

FIG. 7 is a diagram of transmitter 702 for a UW-EC-CRC signal(s) diversity. Since transmitter 702 may utilize both a CRC and UW-EC error check, diversity may be achieved whereby if one check fails, the other may be utilized for error checking. In addition, both error-checking procedures may be utilized for enhanced protection. This may be desired for critical data or control communications such as 911, emergencies, or the like.

CRC may improve performance when combined with UW-EC by increasing robustness and diversity for error prone or high interference channels. Data 704 may pass through source encoder 706 to CRC component or function 708 where a CRC may be attached. The output of CRC component or function 708 may be signaled to channel encoder 710 that generates systematic bits with CRC and parity bits. Channel encoder 710 may be but not limited to polar codes, systematic polar codes, LDPC, turbo codes, etc. Systematic bits that may include data with an attached CRC may be signaled to EC bit generation component or function 714 which adds EC capability for data or CRC and data. EC bits are used to select UW-EC codeword u or c by UW-EC codeword selection component or function 716 from UW-EC codebook component or function 718.

UW waveform generator component or function 712 may generate a UW waveform based on systematic bits that may include data with an attached CRC outputted from channel encoder 710. UW waveform may be generated by a component such as transmitter 302, transmitter 401, or the like. A UW-EC codeword may be used to generate an UW-EC sequence(s) that may be added to a UW waveform generated at UW waveform generation component or function 712 by either inserting c or adjusting u at addition component or function 720. Adjustment of u may be performed by meeting the condition:

$$M_{22}u = c. \qquad \text{Equation (2)}$$

A UW-EC waveform may be generated by UW-EC waveform component or function 722 and communicated as transmitted signal 724.

Figure 8:
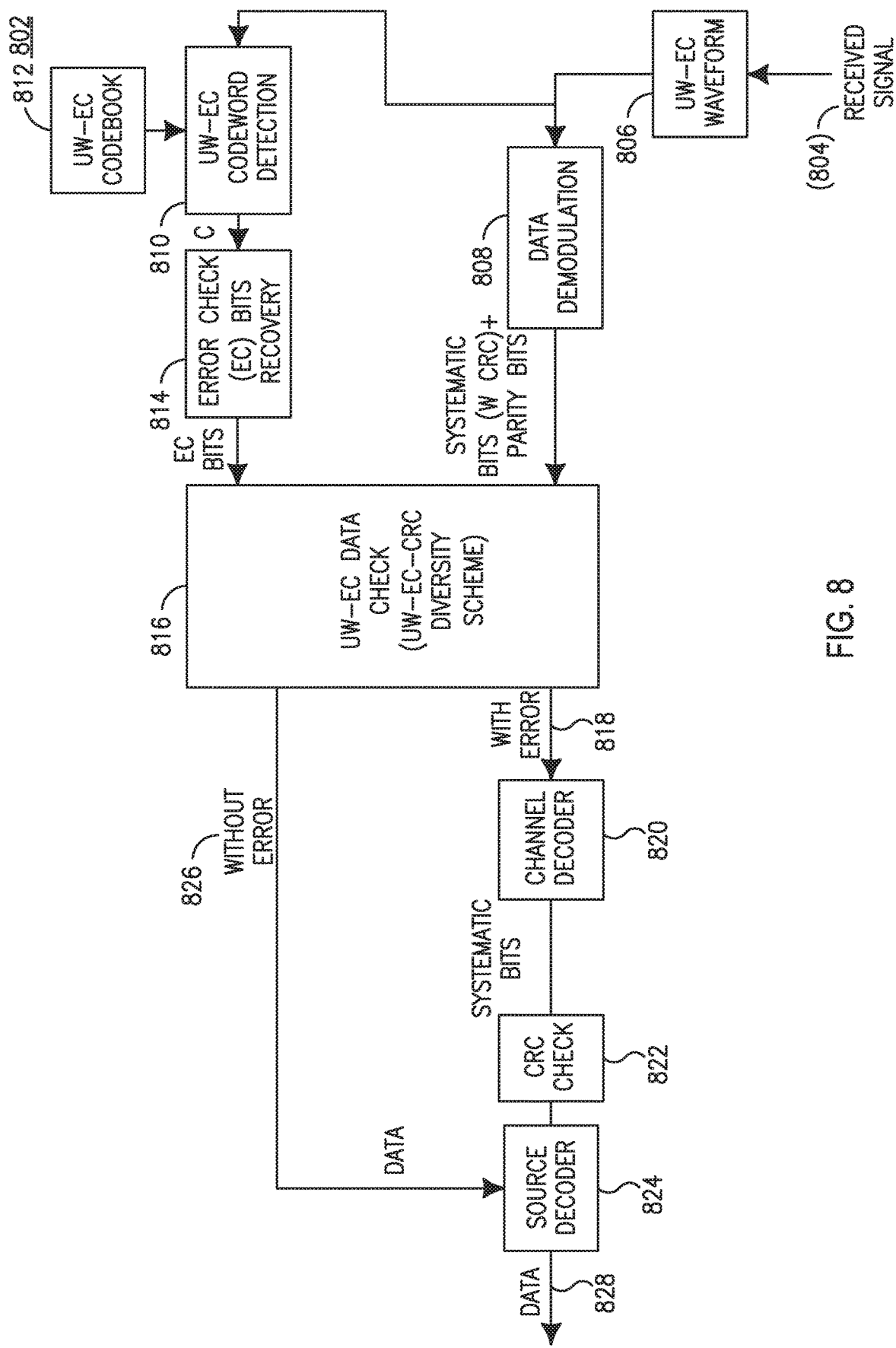
FIG. 8 is a diagram of a receiver for a UW-EC-CRC diversity scheme.

FIG. 8 is a diagram of a receiver 802 for a UW-EC-CRC diversity scheme. Receiver 802 may detect UW-EC sequence(s) from the received signal 804 at UW-EC waveform component or function 806. A UW-EC codeword c may be detected by UW-EC codeword detection component or function 810 by utilization of UW-EC codebook component or function 812. Receiver 802 may communicate with transmitter 702 such that UW-EC codebook component or function 812 may be synchronized with UW-EC codebook component or function 718. In addition, the two codebooks may be pre-defined or configured such that receiver 802 may decode received signal 804 by utilizing blind detection algorithms, as understood by one of ordinary skill in the art.

EC bits may be generated from codeword c by EC bits recovery component or function 814. If packets or channel data can be detected successfully by UW-EC-CRC pre-decoder data check component or function 816 utilizing EC bits, CRC outputs, and/or systematic bits with CRC and parity bits generated by data demodulation component or function 808, processing by channel decoder 820 may be bypassed. Instead, output data without an error(s) 826 is signaled to source decoder 824 to output data 828. Channel decoder 820 may be configured to perform turbo decoding, convolutional decoding, LDPC channel decoding, polar decoding, block decoding, or the like.

If UW-EC-CRC pre-decoder data check component or function 816 cannot successfully detect packets or channel data using EC bits, CRC outputs, and/or systematic bits with CRC and parity bits, channel decoding or additional error checking may be needed at receiver 802. Demodulated data-by-data demodulation component or function 808 is signaled as systematic bits with CRC and parity bits and utilized by UW-EC-CRC pre-decoder data check component or function 816 to signal data with error(s) 818 to channel decoder 820. Channel decoded systematic bits may be signaled to CRC check component or function 822 to detect any errors and output a signal(s) for source decoder 824. Source decoder 824 may output data 828 by utilizing CRC checked output(s) of CRC check component or function 822.

For communications between transmitter 702 and receiver 802, substantially the same UW-EC sequence(s) may be utilized for every symbol of a transmission time interval (TTI). This configuration may be desirable to maintain cyclicity within a TTI. As another example, a UW-EC or CRC may be split into multiple symbols within a TTI. This configuration may reduce blind detection complexity at receiver 802 by reducing a number of codes or sequences or reduce code(s) or sequence(s) length at a cost of possible reduced cyclicity that may need advanced signal processing.

Figure 9:
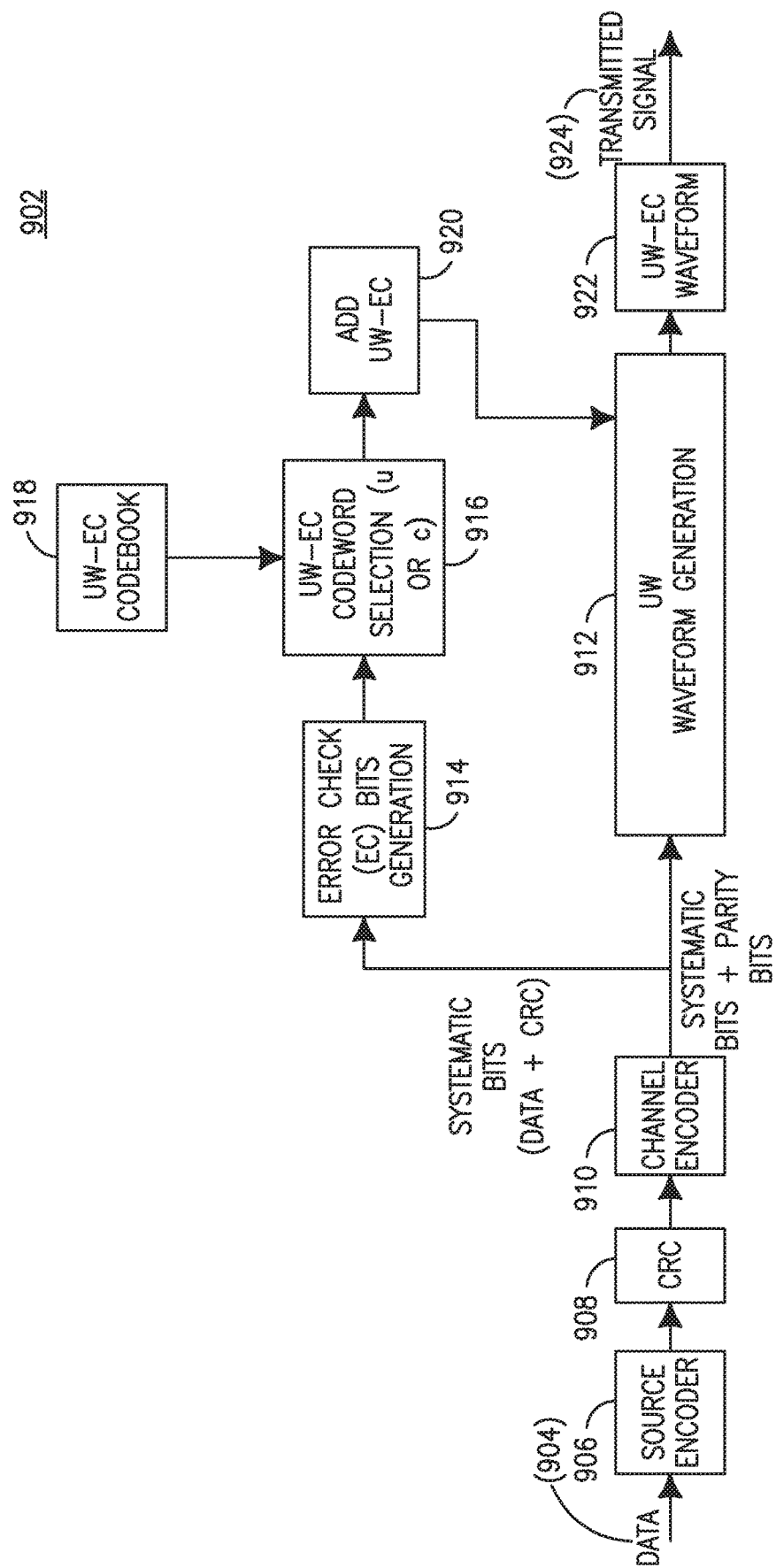
FIG. 9 is a diagram of a transmitter for UW-EC on CRC signal(s)

FIG. 9 is a diagram of a transmitter 902 for UW-EC on CRC signal(s). Data 904 may pass through source encoder 906 and CRC component or function 908 to channel encoder 910 that generates systematic bits with CRC and parity bits. The output of CRC component or function 908 may be signaled to channel encoder 910 which generates systematic bits with CRC and parity bits. Channel encoder 910 may utilize polar codes, systematic polar codes, LDPC, turbo codes, etc. Systematic bits that may include data with an attached CRC may be signaled to EC bit generator component or function 914 which adds EC capability to a CRC portion. EC bits may be used to select UW-EC codeword u or c by UW-EC codeword selection component or function 916 from UW-EC codebook component or function 918.

UW waveform generator component or function 912 may generate a UW waveform based on systematic and parity bits from channel encoder 910. UW waveform may be generated by a component such as transmitter 302, transmitter 401, or the like. UW-EC codeword may be used to generate an UW-EC sequence(s) which is added to a UW waveform generated at UW waveform generation component or function 912 by either inserting c or adjusting u at add component or function 920. Adjustment of u may be performed by meeting the condition:

$$M_{22}u = c. \qquad \text{Equation (3)}$$

A UW-EC waveform may be generated by UW-EC waveform component or function 922 and communicated as transmitted signal 924.

Figure 10:
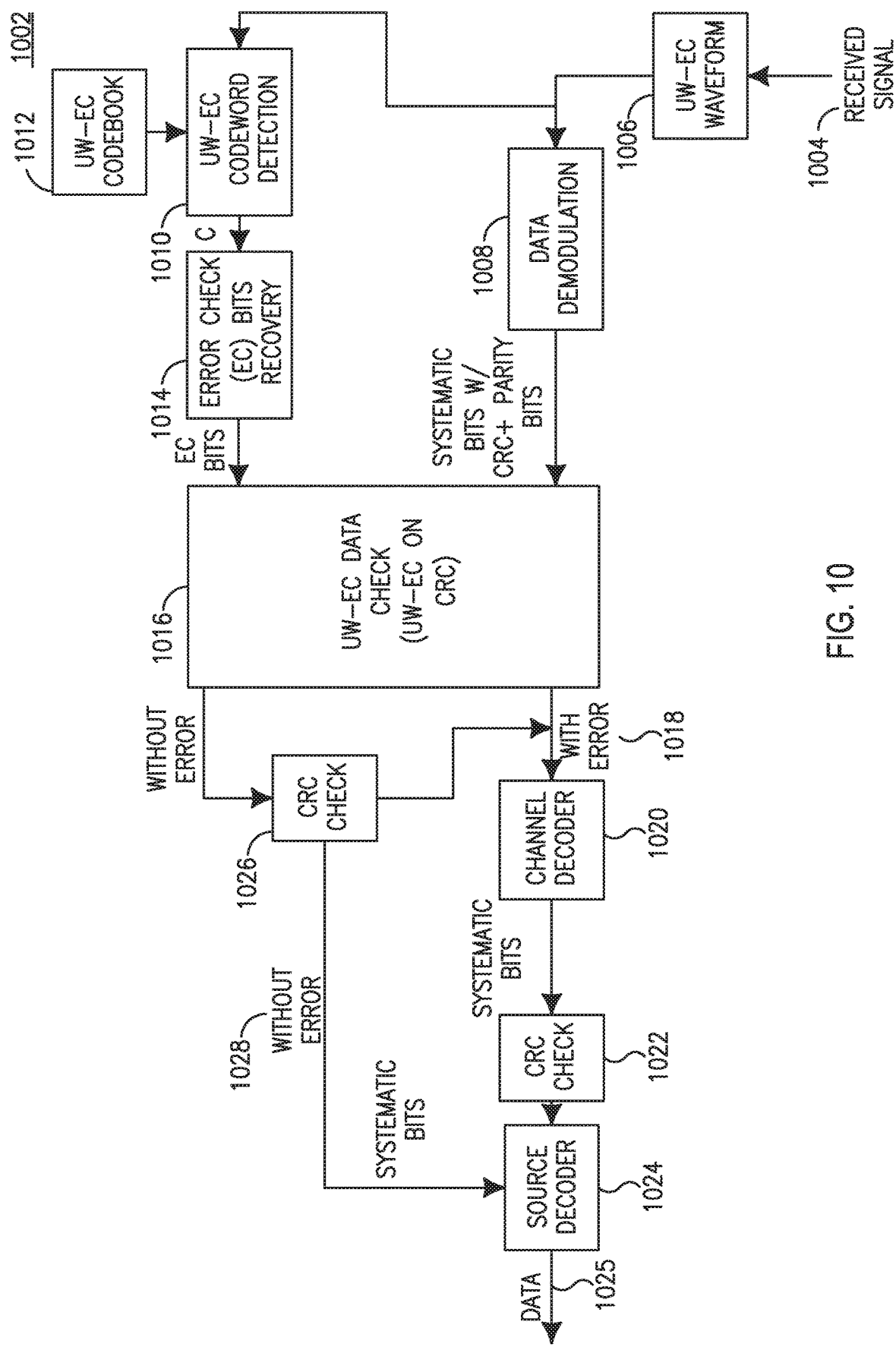
FIG. 10 is a diagram of a receiver for a UW-EC on CRC signal(s) data check.

FIG. 10 is a diagram of a receiver 1002 for a UW-EC on CRC signal(s) data check. The UW-EC on CRC scheme may be performed in at least two steps. At a transmitter, CRC may be fed to the input of an EC generation block using ECF function to generate EC bits or UW-EC bits which may be used to generate a UW-EC code or sequence. At a receiver at least two steps may be performed by using a UW-EC to check on explicit CRC bits, and if successful/pass, use passed explicit CRC bits to check on data. Receiver 1002 may detect UW-EC sequence(s) from received signal 1004 at UW-EC waveform component or function 1006. A UW-EC codeword c may be detected by UW-EC codeword detection component or function 1010 by utilization of UW-EC codebook component or function 1012. Receiver 1002 may communicate with transmitter 902 such that UW-EC codebook component or function 1012 may be synchronized with UW-EC codebook component or function 918. In addition, the two codebooks may be pre-defined or configured such that receiver 1002 may decode received signal 1004 by utilizing blind detection algorithms, as understood by one of ordinary skill in the art.

EC bits may be generated from codeword c by EC bits recovery component or function 1014. UW-EC on CRC pre-decoder data check component or function 1016 utilizes EC bits to perform error check on CRC generated by demodulation component or function 1008 to detect a data error(s). If successful, such as based on a correct CRC, then a data integrity check may be performed on systematic bits for a CRC error check using the "correct CRC" by CRC check component or function 1026. If the CRC check is successful, channel decoding by channel decoder 1020 may be bypassed and data without an error(s) 1028 is signaled to source decoder 1024 to output data 1025. Channel decoder 1020 may be configured to perform turbo decoding, convolutional decoding, LDPC channel decoding, polar decoding, block decoding, or the like.

If a CRC error check by CRC check component or function 1026 is unsuccessful, such as based on an incorrect or failed data integrity check, channel decoding or additional error checking may be needed at receiver 1002. Demodulated data generated by data demodulation component or function 1008 is signaled as systematic bits with CRC and parity bits and utilized by UW-EC on CRC pre-decoder data check component or function 1016 to signal data with error(s) 1018 to channel decoder 1020. In addition to systematic bits with CRC and parity bits, channel decoder 1020 may utilize unsuccessful error check results from CRC check component or function 1026 for decoding and subsequent signaling to CRC check component or function 1022. CRC check component or function 1022 may function as an additional tier to detect any errors and output a signal(s) for source decoder 1024. Source decoder 1024 may output data 1025 by utilizing CRC checked output(s) of CRC check component or function 1022.

The configuration of transmitter 902 and receiver 1002 may allow error checking on explicit CRC instead of data bits by using UW-EC. Utilizing UW-EC on CRC may ensure the correctness of CRC before an error check is performed on data. This may shorten a UW-EC sequence(s) length since CRC length may be typically shorter than the data. Thus, a lower number of UW-EC sequences may be needed in a communication. For certain applications, UW-EC on CRC may significantly reduce detection complexity and detection error at receiver 1002.

Moreover, for communications between transmitter 902 and receiver 1002, substantially the same UW-EC sequence(s) may be utilized for symbols within a TTI. This configuration may be desirable to maintain signal cyclicity and coherent detection at receiver 1002.

Any of transmitters 302, 401, 502, 702, or 902 may be configured to operate or made part of WTRU 102, base station 114a, base station 114b, or e-Node-Bs 140a-140c. Similarly, any of receivers 318, 402, 602, 802, or 1002 may be configured to operate or made part of WTRU 102, base station 114a, base station 114b, or e-Node-Bs 140a-140c.

Figure 11:
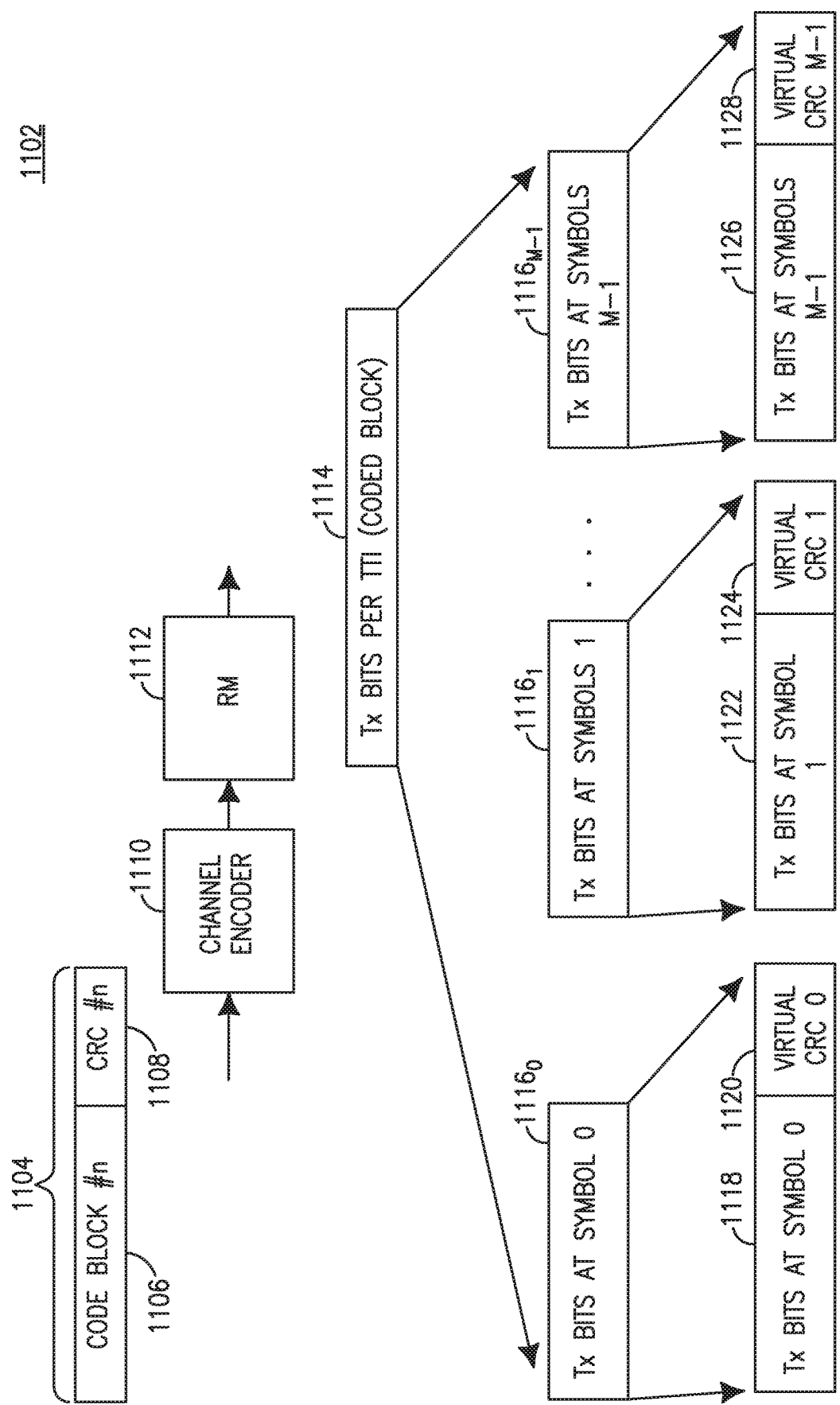
FIG. 11 is a diagram of a sub-block virtual CRC (VCRC) structure.

FIG. 11 is a diagram of a sub-block VCRC structure 1102 that may be utilized by transmitters 702 or 902, as desired. A packet 1104 may include code block #n 1106 with CRC #n 1108. Packet 1104 may be processed by channel encoder component or function 1110 and subsequently provided to rate match component or function 1112 to generate coded block 1114. A transmission per TTI coded block 1114 may be split into M transmit sub-blocks $1116_0$-$1116_{M-1}$. Each sub-block may include one or more symbols, such as OFDM symbols. Each sub-block may be attached with virtual CRC (VCRC) 1120, 1124, or 1128 to transmit bit symbols 1118, 1122, or 1126, respectively. At a receiver, if any of M transmit sub-blocks $1116_0$-$1116_{M-1}$ matches a VCRC, reception of a data packet may be successful. When successful, channel decoding, such as turbo decoding, LDPC decoding, polar decoding, or the like may be bypassed or skipped increasing performance and reducing complexity.

When a VCRC of any of M transmit sub-blocks $1116_0$-$1116_{M-1}$ does not match, channel decoding may be performed. To increase speed and lower power usage, a VCRC matched sub-block may be utilized as a priori knowledge or a priori information to a channel decoder. A sub-block VCRC may be decoded by a low-latency channel decoder, a low-latency turbo decoder, low-latency LDPC, low-latency polar code, or the like. In addition, a VCRC may be carried or incorporated into a UW-EC sequence(s). The sub-block VCRC structure may be applied to a code block or un-coded block. Similarly, parity check bits generated by parity check function such as exclusive OR (XOR) operation or repetition of a data within sub-block may be carried or incorporated into a UW-EC sequence(s).

Moreover, a sub-block VCRC may utilize systematic rate-compatible insertion convolutional encoder and UW waveforms such as UW-OFDM, UW-DFT-OFDM, or the like. In UW-OFDM or UW-DFT-s-OFDM, when a VCRC is indicated by a UW-EC sequence(s), the detected UW-EC sequence(s) or VCRC may be used for error detection of a transmitted code sub-block. If a transmitted code sub-block passes a VCRC utilizing a UW-EC sequence(s) at a receiver, such as receiver 802 or 1002, the transmitted code sub-blocks may bypass channel decoder 820 or 1020, respectively.

A transmission code block may include systematic code bits b. A starting point for systematic code bits b may be needed at the beginning of a circular buffer. However, for a smaller packet size such as a control channel transmission in LTE, a downlink control information (DCI) communication, an uplink control information (UCI) communication, a special transmission, or the like channel encoder, such as 508, 710, 910, or 1110, may use convolution coding instead of turbo coding for better performance.

Figure 12:
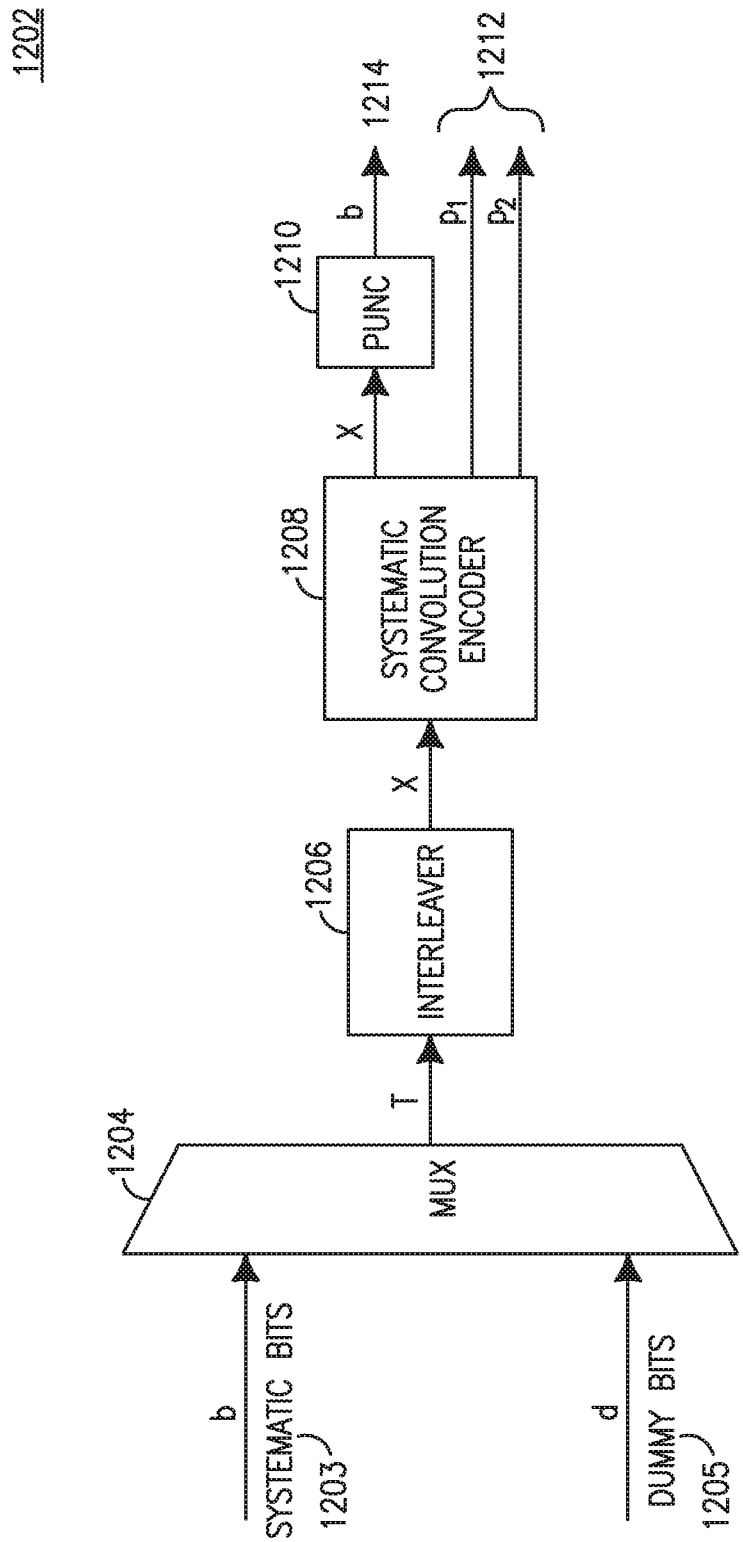
FIG. 12 is a diagram of a systematic rate-compatible insertion convolutional (RCIC) encoder.

FIG. 12 is a systematic rate-compatible insertion convolutional (RCIC) encoder 1202. Systematic bits b may be generated at output 1214 based on multiplexor 1204 multiplexing systematic bits b 1203 and dummy bits d 1205 to produce stream T. Stream T may be interleaved by interleaver 1206 to produce interleaved stream X that may be encoded by systematic convolution encoder 1208 that outputs X and coded outputs $p_1$ and $p_2$ 1212. RCIC encoder 1202 may achieve coding rates similar to that of 3rd Generation Partnership Project (3GPP) LTE or LTE-A standards and utilize a VCRC.

For waveform generation, such as by transmitter 302, a UW-OFDM the signal may be expressed as:

$$x = F^H BP \begin{bmatrix} d \\ r \end{bmatrix}.$$  Equation (4)

A UW-DFT-s-OFDM signal, such as those generated by transmitter 402, may be expressed as:

$$x = F^H BSP \begin{bmatrix} d \\ r \end{bmatrix}.$$  Equation (5)

Equations (4) and (5) are substantially similar except for DFT spreading matrix S. Thus, a generic expression for a UW waveform such as UW-OFDM and UW-DFT-s-OFDM may be expressed as:

$$A = F^H B(S) P + \begin{bmatrix} M_{11} & M_{12} \\ M_{21} & M_{22} \end{bmatrix},$$  Equation (6)

where $M_{21} \in \mathbb{C} N_{tail} \times N_d$, $M_{22} \in \mathbb{C} N_{tail} \times N_r$, and $N_{tail}$ may be a number of samples at a tail. The non-tail part and the tail part of a symbol may then be obtained as:

$$x = \begin{bmatrix} x_{non-tail} \\ x_{tail} \end{bmatrix} = \begin{bmatrix} M_{11} & M_{12} \\ M_{21} & M_{22} \end{bmatrix} \begin{bmatrix} d \\ r \end{bmatrix},$$  Equation (7)

where $x_{non-tail} \in \mathbb{C}^{(N-N_{tail}) \times 1}$ and $x_{tail} \in \mathbb{C}^{(N-N_{tail}) \times 1}$ and $r = s + u$. Variable $x_{tail}$ may also be expressed as:

$$x_{tail} = \underbrace{M_{21}d + M_{22}s}_{\text{Tail suppression}} + \underbrace{M_{22}u}_{\text{UW-EC sequence}}$$  Equation (8)

or $$x_{tail} = \underbrace{M_{21}d + M_{22}r}_{\text{Tail suppression}} + \underbrace{c}_{\text{UW-EC sequence}}.$$  Equation (9)

The first two terms of Equation (8) $M_{21}d + M_{22}s$ may represent a tail suppression operation and the third term of Equation (8) $M_{22}u$ may represent how a UW-EC sequence(s) may be generated. If $M_{22}$ is a complete matrix, for example $N_{tail} \leq N_r$, arbitrary UW sequence(s) via vector u may be generated. In addition, a UW-EC sequence(s) may be generated by $M_{22}u$ or c.

If a predetermined set of orthogonal sequences $\{c^i\}_{i=1}^M$ serve as a UW-EC sequence(s), generating a UW-EC sequence(s) may comprise:

$$M_{22}u = \{c^i\}_{i=1}^M.$$  Equation (10)

In Equation (10), the following relationship may be desirable:

$$M_{22}u^i = c^i, \text{ where } i = 1, 2, \ldots M.$$  Equation (11)

Moreover, vector u in the frequency domain may be adjusted to generate a UW-EC sequence(s) c in time as given:

$$u = M_{22}^{-1} c.$$  Equation (12)

After an error check bit operation(s), such as by 516, 714, or 914, a sequence(s) or codeword c from UW-EC codebook component or function 520, 718, or 918 may be selected. A UW-EC sequence(s) may be generated by inserting c or adjusting u. When adjusting u, the condition $M_{22}u = c$ may be desirable.

Figure 13:
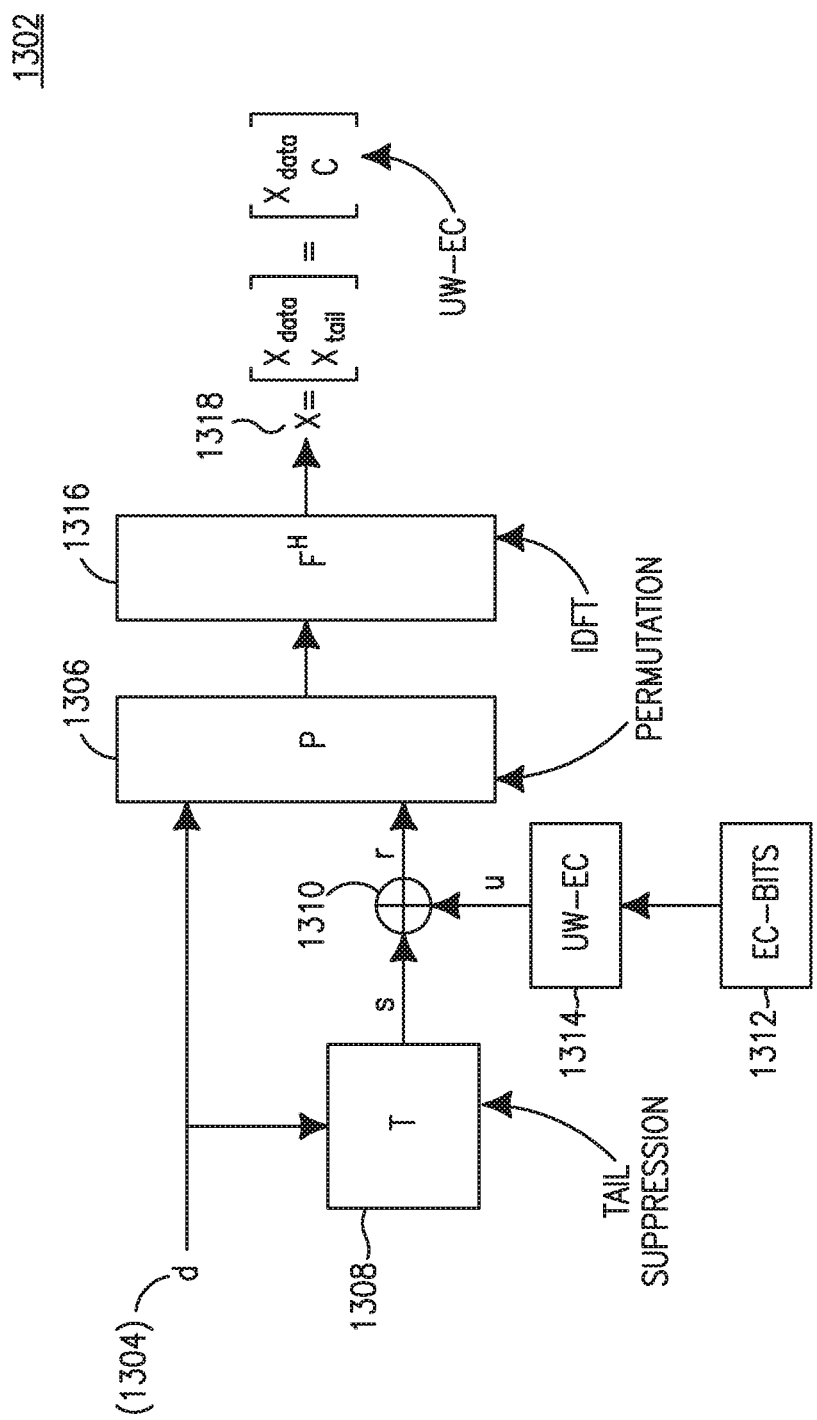
FIG. 13 is a diagram of UW-EC waveform generation.

FIG. 13 is an example of UW-EC waveform generation by generation component or function 1302. For generation component or function 1302, a UW-EC waveform may be generated based on systematic bits. Systematic encoders may utilize turbo codes, convolutional codes, LDPC codes, polar codes, block codes, or the like. In generation component or function 1302, a UW-EC may be added by UW-EC component or function 1314 utilizing EC bits provided by EC bits component or function 1312 in the frequency domain.

In generation component or function 1302, data vector(s) d 1304 may be inputted to tail suppression component or function 1308 to produce sequence s that is combined by addition component or function 1310 with vector u to produce redundant subcarriers r. Permutation matrix P component or function 1306 may map elements of redundant subcarriers r and data vector(s) d 1304 to be converted to the time domain by inverse DFT component or function 1316 producing output signal x 1318. Output signal x 1318 may be expressed as follows:

$$\begin{bmatrix} x_{data} \\ x_{tail} \end{bmatrix} = \begin{bmatrix} x_{data} \\ c \end{bmatrix}.$$  Equation (13)

In equation 13, c may be a UW-EC code, a UW-EC sequence, or the like in the time-domain.

A systematic block code may be represented as G=[I|P], where I is identity matrix. Systematic block codes may include systematic Reed-Solomon (RS) codes and system cyclic codes with G expressed as:

Systematic cyclic codes  Equation (14)

$$G = \begin{bmatrix} 0 & 1 & 0 & 1 & 1 & 1 & | & 1 & 0 & 0 & 0 \\ 1 & 0 & 1 & 0 & 1 & 1 & | & 0 & 1 & 0 & 0 \\ 1 & 1 & 0 & 1 & 0 & 1 & | & 0 & 0 & 1 & 0 \\ 1 & 1 & 1 & 0 & 1 & 0 & | & 0 & 0 & 0 & 1 \end{bmatrix}$$
$$\underbrace{\phantom{0\ 1\ 0\ 1\ 1\ 1}}_{\text{circular code}} \underbrace{\phantom{1\ 0\ 0\ 0}}_{\text{identy matrix}}$$

When a CRC is utilized, given a CRC length c, m errors may be detected if m<c. An error may not be detected if the m error vector is divisible by a CRC polynomial. If a CRC length is equal to c, then a CRC operation may not detect m>=c burst bits error(s) where m may be express a continuous bit error.

CRC performance may be measured based on any one of an undetected error probability $P_{ud}$, packet length n, CRC length c, poly-generator characteristics, or a BER. $P_{ud}$ may approximately be determined by:

$$P_{ud} \approx \sum_{i=d_{min}}^{d_{max}} \frac{\binom{n}{i}}{2^{c-1}} (1-\varepsilon)^{n-i} \varepsilon^i. \qquad \text{Equation (15)}$$

Where ε is a BER probability, $d_{min}$ is a minimum number of non-zero elements in any nonzero codeword, and $d_{max}$ is a maximum number of non-zero elements in any nonzero codeword. In some configurations, a BER may be approximately $10^{-1}$ and below and a poly generator CRC assumed to be optimal.

UW-based mutually orthogonal codes or sets of sequences may be desirable. A set of M sequences may be defined as $\{c^i\}_{i=1}^M$ where each length of $c^i$ is equal to L. Two distinct sets of sequences $\{c_1^i\}_{i=1}^M$, $\{c_2^i\}_{i=1}^M$ are said to be mutually orthogonal, if $\phi_{c_1^i, c_2^j}(\tau=0)=0 \; \forall i \neq j$ and i, j $\in \{1, \ldots, M\}$ where $\phi_{c_1^i, c_2^j}(\tau)$ denotes the periodic cross-correlation between $c_1^i$ and $c_2^j$. Mutually orthogonal sets of sequences may be constructed by complementary sequences such as Golay complementary sequences. Other codes such as Zadoff-Chu (ZC) sequences, constant amplitude zero autocorrelation waveform (CAZAC) sequences, cyclic shift codes, or the like may also be utilized.

A number of sequences M in a set may decrease with an interference free window (IFW) or zero correlation zone (ZCZ) length. For example, a $\{c_1^i\}_{i=1}^M$, $\{c_2^i\}_{i=1}^M$ (L=16, M=8, ZCZ=1) code may be represented as follows:

$b_1^1 = (+++++++++-+-+-+-)$ $b_2^1 = (++++++++-+-+-+-+)$ $b_1^2 = (++--++--+--++--+)$ $b_2^2 = (++--++---++--++-)$ $b_1^3 = (++++-----+-+---+)$ $b_2^3 = (++++------+-++-+-)$ $b_1^4 = (++----+++--+--++-)$ $b_2^4 = (++-----++-++-+--+)$ $b_1^5 = (+-+-+-+-+++++++)$ $b_2^5 = (+-+-+-+---------)$ $b_1^6 = (+--++---+++---++--)$ $b_2^6 = (+---++---+--++--++)$ $b_1^7 = (+-+---+-+++++----)$ $b_2^7 = (+-+---+-+-----++++)$ $b_1^8 = (+--+-++--++-----++)$ $b_2^8 = (+---+-++---++++--).$

A pre-decoder data check as given in receivers 602, 802, or 1002 may be configured for multi-user support and multiplexing. In this configuration, each user may be assigned a code according to UW-EC which is generated either from data, from an explicit CRC, or from both data and a CRC. In a single user configuration, each user device, such as WTRU 102), detects a code. In multi-user configurations, each user device may detect several UW-EC codes substantially simultaneously.

Also for multi-user configurations, each user device, such as WTRU 102, may utilize each of the detected UW-EC codes to generate UW-EC bits and use UW-EC bits to check for a data error(s). A user device may also utilize all detected UW-EC codes and UW-EC bits, as desired. In one configuration, with multi-user detection when only one UW-EC code is successfully detected, received data may be designated as a pass.

Referring again to FIG. 5, transmitter 502 may be configured to utilize N UW-EC bits based on data 504. A UW-EC sequence(s) v out of K sequences may be selected for the data where UW-EC K sequences are orthogonal, may have substantially low correlation sequences, and/or the following condition is met:

$$K = 2^N. \qquad \text{Equation (16)}$$

A UW-EC codebook size may be set to K.

Referring again to FIG. 6, at receiver 602, v may be detected from received data d of received signal 604. UW-EC bits may be reconstructed according to v. Error checking on received data d may be performed. If an error is found, data may be sent for channel decoding by channel decoder 618. If an error is not found, channel decoding may be bypassed or skipped and data sent directly to source decoder 622.

Superposition may be utilized for multi-user detection. After detection of v, v-to-W may be utilized as a one-to-one mapping to determine W, where W is a diagonal matrix with a diagonal that is a random sequence. The random sequence for W may be an interleaved pattern or a pseudo-random code(s). With a given W, data may be decoded. For a control-assisted UW multi-user approach, control may be decoded to obtain UW-EC, which may be then used to error check on CRC, utilize UW-EC to determine v, or utilize a v one-to-one mapping to W to determine W.

Figure 14:
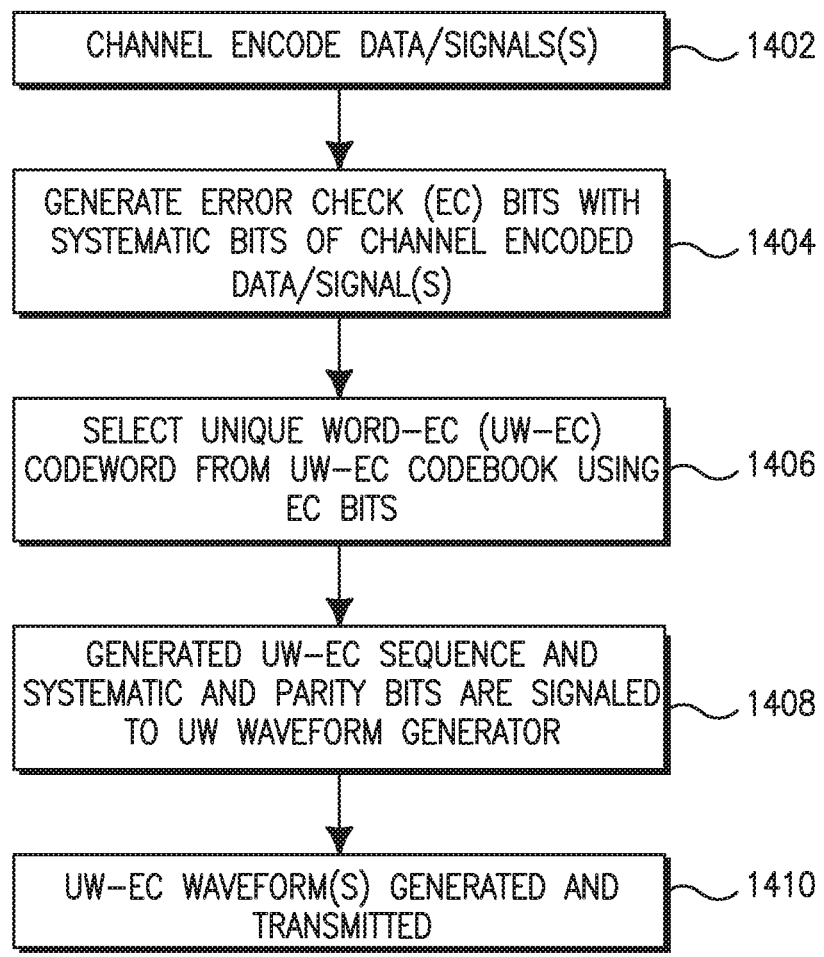
FIG. 14 is a process for generating and transmitting a UW-EC waveform.

FIG. 14 is a process 1400 for generating and transmitting a UW-EC waveform. Data or a signal(s) may be channel encoded (1402). EC bits may be generated with systematic bits generated by channel encoding of data or a signal(s) (1404). A UW-EC codeword may be selected from UW-EC codebook using the generated EC bits (1406). A generated UW-EC sequence and systematic and parity bits may be signaled to a UW waveform generator (1408). A UW-EC waveform may subsequently be generated and transmitted (1410).

Figure 15:
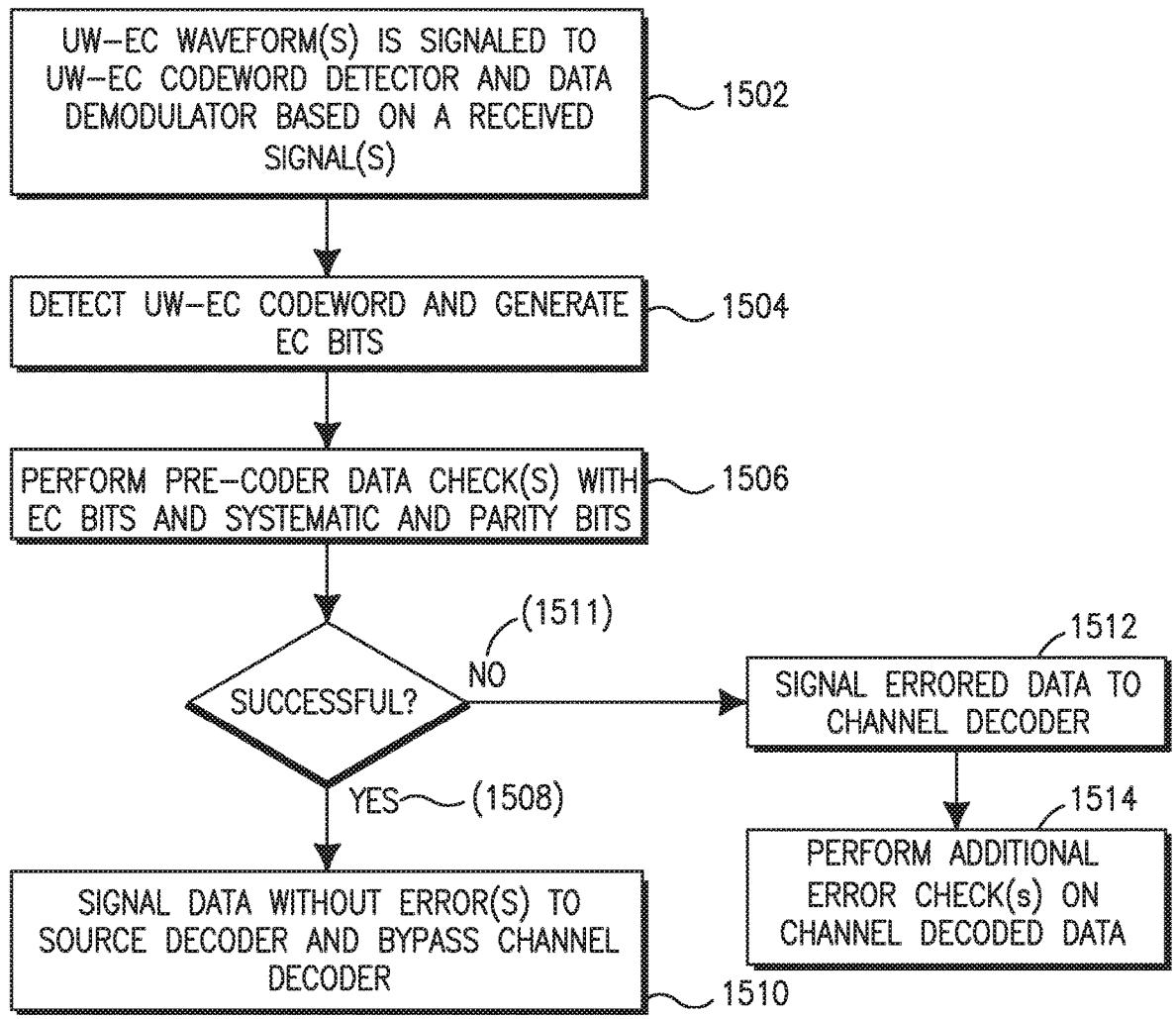
FIG. 15 is a process for receiving and demodulating a UW-EC waveform.

FIG. 15 is a process 1500 for receiving and demodulating a UW-EC signal or waveform. A UW-EC waveform(s) is signaled to UW-EC codeword detector and data demodulator based on a received signal(s) (1502). A UW-EC codeword and EC bits are detected (1504). A pre-decoder data check(s) may utilize EC bits and systematic and parity bits (1506) to determine if any errors exist. If no error(s) is detected, the check is successful (1508) and data without an error(s) is signaled to a source decoder and a channel decoder is bypassed (1510). If an error(s) is detected, the check is unsuccessful (1511) and data with an error(s) is signaled to a channel decoder (1512). An additional error check(s) on channel decoded data (1514) may also be performed.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a processor; and
a transceiver operatively coupled to the processor; wherein:
the processor is configured to generate a block of data for transmission;
the processor is further configured to determine a block cyclic redundancy check (CRC) and append the determined block CRC to the block of data;
the processor is further configured to divide the block of data and the appended block CRC into a plurality of transmit sub-blocks, wherein one of the transmit sub-blocks includes the appended block CRC;
for each of the transmit sub-blocks, the processor is further configured to:
determine a sub-block CRC, as a respective determined sub-block CRC, and
attach the respective determined sub-block CRC to that transmit sub-block;
the processor is further configured to generate an orthogonal frequency division multiplex (OFDM) signal derived from the plurality of transmit sub-blocks and the attached sub-block CRCs, wherein at least the block of data and the appended block CRC are low density parity check (LDPC) coded;
the transceiver is configured to transmit the OFDM signal; and
the transceiver is further configured to receive feedback including an indication whether to retransmit data of the block of data responsive to the transmitted sub-block CRCs.

2. The WTRU of claim 1, wherein the block of data is an un-coded block.

3. The WTRU of claim 1, wherein the block of data is a coded block.

4. The WTRU of claim 1, wherein the transmitted OFDM signal has error checking performed at the receiver using the sub-block CRCs and the block CRCs to add extra error protection.

5. The WTRU of claim 1, wherein the indication whether to retransmit data of the block of data is not received responsive to the transmitted appended block CRC.

6. The WTRU of claim 1, wherein the indication whether to retransmit data of the block of data is received responsive to the transmitted appended block CRC.

7. The WTRU of claim 1, wherein the transceiver is further configured to receive, in addition to the received feedback, a further type of feedback including an indication whether to retransmit data of the block of data responsive to successful decoding of the block of data.

8. A wireless transmit/receive unit (WTRU) comprising:
a processor; and
a transceiver operatively coupled to the processor; wherein:
the transceiver is configured to receive an orthogonal frequency division multiplex (OFDM) signal derived from a plurality of sub-blocks and attached sub-block CRCs, wherein the plurality of sub-blocks are divisions of a block of data and an appended block cyclic redundancy check (CRC), wherein one of the sub-blocks includes the appended block CRC; wherein at least the block of data and the appended block CRC are low density parity check (LDPC) coded;

the processor is configured to generate an indication whether to retransmit data of the block of data based on the received sub-block CRCs;
the processor is further configured to generate feedback including the indication whether to retransmit data of the block of data; and
the transceiver is further configured to transmit the feedback.

9. The WTRU of claim 8, wherein the proceesor is furhter configured to determine to not generate the indication whether to retransmit data of the block of data based on the received appended block CRC.

10. The WTRU of claim 8, wherein the indication whether to retransmit data of the block of data is generated further based on the received appended block CRC.

11. The WTRU of claim 8, wherein:
the processor is further configured to generate an indication whether to retransmit data of the block of data based on successful decoding of the block of data;
the processor is further configured to generate a further type of feedback including the indication whether to retransmit data of the block of data; and
the transceiver is further configured to transmit, in addition to the transmitted feedback, the further type of feedback.

12. The WTRU of claim 8, wherein the block of data is an un-coded block.

13. The WTRU of claim 8, wherein the block of data is a coded block.

14. A method performed in a wireless transmit/receive unit (WTRU), the method comprising:
generating a block of data for transmission;
determining a block cyclic redundancy check (CRC) and appending the determined block CRC to the block of data;
dividing the block of data and the appended block CRC into a plurality of transmit sub-blocks, wherein one of the transmit sub-blocks includes the appended block CRC;
for each of the transmit sub-blocks,
determining a sub-block CRC, as a respective determined sub-block CRC, and;
attaching the respective determined sub-block CRC to that transmit sub-block;
generating an orthogonal frequency division multiplex (OFDM) signal derived from the plurality of transmit sub-blocks and the attached sub-block CRCs, wherein at least the block of data and the appended block CRC are low density parity check (LDPC) coded;
transmitting the OFDM signal; and
receiving feedback including an indication whether to retransmit data of the block of data responsive to the transmitted sub-block CRCs.

15. The method of claim 14, wherein the block of data is an un-coded block.

16. The method of claim 14, wherein the block of data is a coded block.

17. The method of claim 14, wherein the transmitted OFDM signal has error checking performed at the receiver using the sub-block CRCs and the block CRCs to add extra error protection.

18. The method of claim 14, wherein the indication whether to retransmit data of the block of data is not received responsive to the transmitted appended block CRC.

19. The method of claim 14, wherein the indication whether to retransmit data of the block of data is received responsive to the transmitted appended block CRC.

20. The method of claim 14, further comprising:
receiving, in addition to the received feedback, a further type of feedback including an indication whether to retransmit data of the block of data responsive to successful decoding of the block of data.

* * * * *